(12) United States Patent
Wang et al.

(10) Patent No.: US 8,571,409 B1
(45) Date of Patent: Oct. 29, 2013

(54) WAVELENGTH-MULTIPLEXED OPTICAL CONTROLLER USING A RING ARCHITECTURE

(75) Inventors: Rui Wang, Davis, CA (US); Behzad Moslehi, Santa Clara, CA (US); Richard J. Black, Menlo Park, CA (US)

(73) Assignee: Intelligent Fiber Optic Systems, Inc., Santa Clara, CA (US)

( * ) Notice: Subject to any disclaimer, the term of this patent is extended or adjusted under 35 U.S.C. 154(b) by 0 days.

(21) Appl. No.: 13/295,032

(22) Filed: Nov. 11, 2011

Related U.S. Application Data

(63) Continuation-in-part of application No. 12/356,526, filed on Jan. 20, 2009, now Pat. No. 8,165,469.

(51) Int. Cl.
*H04J 14/00* (2006.01)
*H04B 10/20* (2006.01)

(52) U.S. Cl.
USPC .................................. 398/59; 398/43; 398/48

(58) Field of Classification Search
USPC .................................... 398/59; 43, 48, 82, 83
See application file for complete search history.

(56) References Cited

U.S. PATENT DOCUMENTS

2010/0086301 A1* 4/2010 Fujita et al. .................. 398/48

* cited by examiner

*Primary Examiner* — Armando Rodriguez
(74) *Attorney, Agent, or Firm* — Jay A. Chesavage; File-EE-Patents.com

(57) ABSTRACT

An optical ring network for fixed length messages from a plurality of nodes for transmission to different nodes uses a plurality of wavelengths for transmission, and messages for transmission are ordered and arranged on a per-wavelength basis to minimize a transmit finish time. Each node may be operated in an ADM (add drop multiplexer) mode where an optical node removes information on a particular wavelength and adds information on the same particular wavelength, or each node may be operated in a CDC (colorless, directionless, contentionless) mode where information is assigned to a wavelength according to a selection algorithm which may place it on any wavelength without regard to an original node wavelength. The selection algorithm optimizes selection of messages and wavelengths for transmit finish time.

15 Claims, 16 Drawing Sheets

Cascade direct FBG sensing w/o redundancy

Cascade direct FBG sensing w/o redundancy

FBG direct w/redundancy

Cascade direct FBG sensing w/ redundancy & Electrical Interface

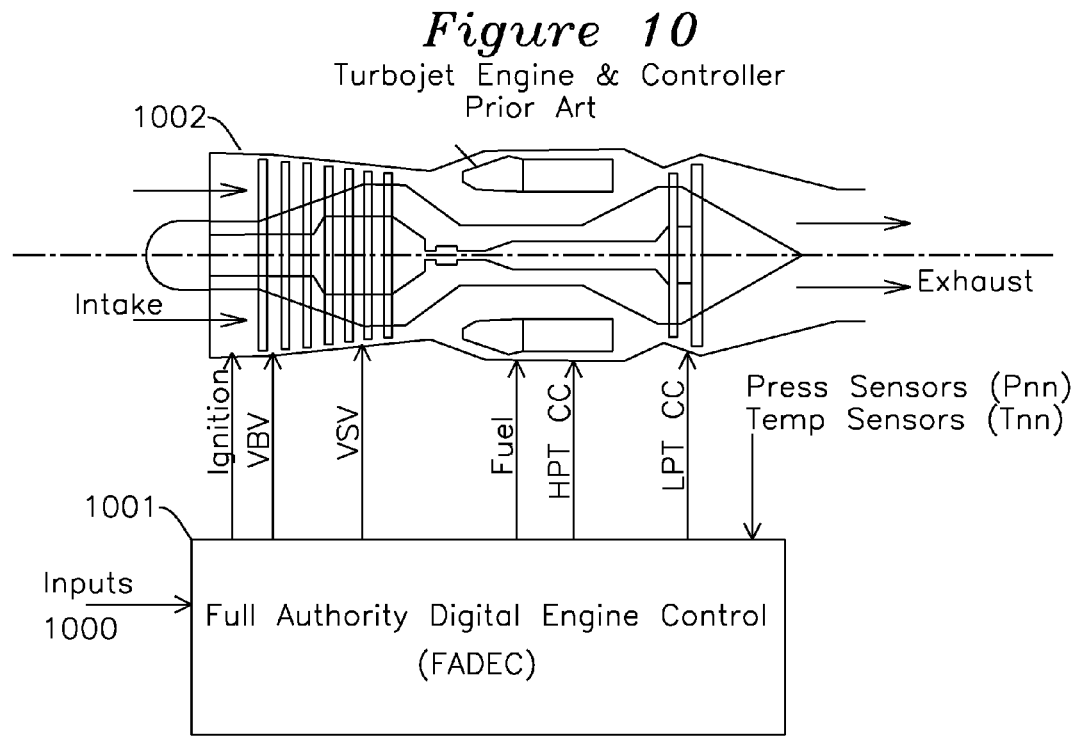
*Figure 10*
Turbojet Engine & Controller
Prior Art
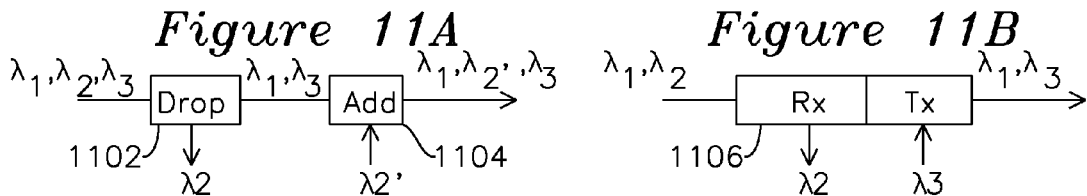
*Figure 11A*   *Figure 11B*
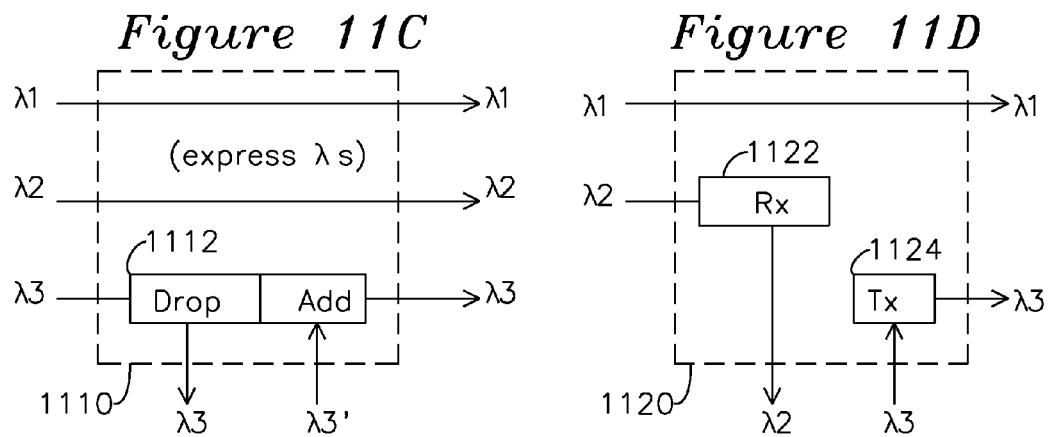
*Figure 11C*   *Figure 11D*

Colorless Directionless Contentionless (CDC) Node

Colorless Directionless Contentionless (CDC) Node

Figure 12
Schedule of Sensors

| Sensor | payload size | Src ID size | Dst ID size | FEC Len | Total Len |
|---|---|---|---|---|---|
| $P_0$ | 36 | 16 | 16 | 7 | 75 |
| $T_{12}$ | 36 | 16 | 16 | 7 | 75 |
| $N_1$ | 36 | 16 | 16 | 7 | 75 |
| $N_2$ | 36 | 16 | 16 | 7 | 75 |
| $T_{26}$ | 36 | 16 | 16 | 7 | 75 |
| $P_{oil}$ | 36 | 16 | 16 | 7 | 75 |
| $PS_3$ | 36 | 16 | 16 | 7 | 75 |
| $T_{case}$ | 36 | 16 | 16 | 7 | 75 |
| $T_{495}$ | 36 | 16 | 16 | 7 | 75 |
| $T_3$ | 36 | 16 | 16 | 7 | 75 |
| $T_{EO}$ | 36 | 16 | 16 | 7 | 75 |
| Fuel Flow | 36 | 16 | 16 | 7 | 75 |
| $PS_{13}$ | 36 | 16 | 16 | 7 | 75 |
| $P_{25}$ | 36 | 16 | 16 | 7 | 75 |
| VBV | 36 | 16 | 16 | 7 | 75 |
| VSV | 36 | 16 | 16 | 7 | 75 |
| TBC | 36 | 16 | 16 | 7 | 75 |
| Fuel | 36 | 16 | 16 | 7 | 75 |
| HPTCC | 36 | 16 | 16 | 7 | 75 |
| LPTCC | 36 | 16 | 16 | 7 | 75 |
| Ignition | 36 | 16 | 16 | 7 | 75 |
| Thrst Rev | 36 | 16 | 16 | 7 | 75 |
| Solenoids | 36 | 16 | 16 | 7 | 75 |

Total bits/cycle 1800

Bit rate @ 20Hz = 36Kb/s

Bit rate @ 100Hz = 180Kb/s

Figure 13A
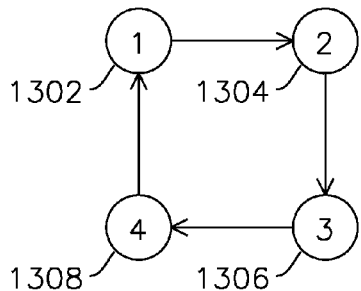
Figure 13B
| Data Flow | Src ID | Dst ID | Msg Len |
|---|---|---|---|
| $r_1$ | 4 | 3 | 3 |
| $r_2$ | 3 | 1 | 2 |
| $r_3$ | 3 | 2 | 1 |
| $r_4$ | 1 | 4 | 5 |
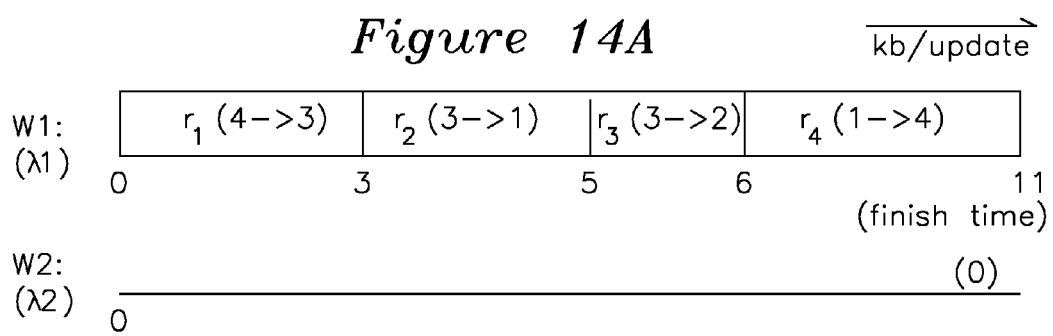
Figure 14A
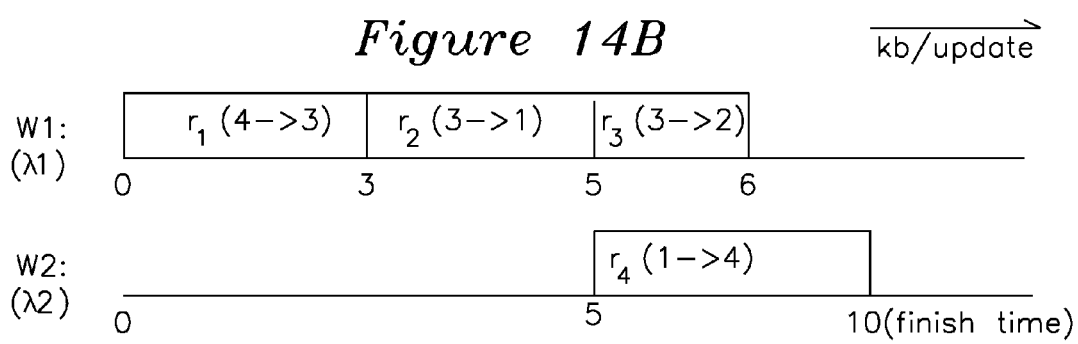
Figure 14B
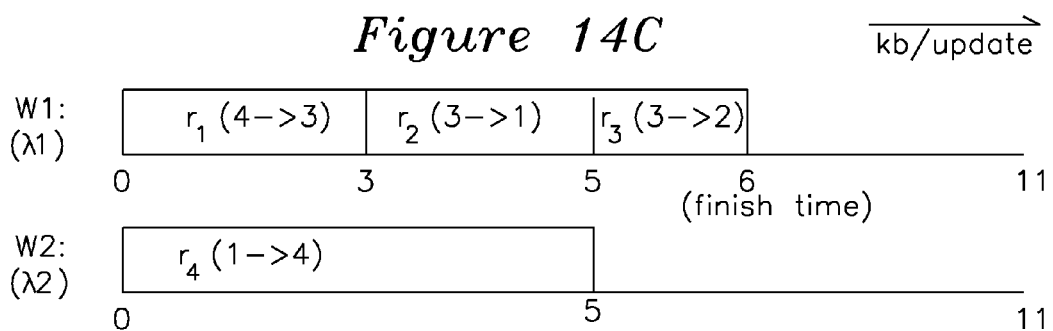
Figure 14C Finish time F as a function of P Finish time F as a function of W

US 8,571,409 B1

WAVELENGTH-MULTIPLEXED OPTICAL CONTROLLER USING A RING ARCHITECTURE

The present invention is a continuation-in-part of application Ser. No. 12/356,526 filed Jan. 20, 2009 now U.S. Pat. No. 8,165,469.

FIELD OF THE INVENTION

The present invention relates to an algorithm and system for an optical ring, such as for use with a full authority digital engine control (FADEC). In particular, the present invention provides a method for assignment of wavelengths in a multi-node ring topology sensor and control network.

BACKGROUND OF THE INVENTION

Measurement of physical phenomenon may be accomplished by converting the phenomenon to be measured to a physical change to a fiber Bragg grating. A Bragg grating is a series of modulations of internal refractive index which are written on the inner core of an optical fiber. These gratings may then be coupled to a structure to be characterized to generate a measurement of strain or temperature. Any physical phenomenon which may be converted to a grating length or index change may be used to accomplish the measurement of the underlying phenomenon. In a typical use, the Bragg grating is illuminated by a broadband source such that multiple Bragg gratings may be interrogated, and each of these gratings illuminated by the broadband source such that each grating reflects a particular wavelength which may be measured to determine the strain or temperature applied to each grating. When the relationship between wavelength and parameter is characterized or understood, the individual reflected wavelengths may be read by a wavelength interrogator, and the change in wavelength can be converted to a physical value. A prior art tunable grating may be seen in U.S. Pat. No. 7,133,582 by Moslehi et al, and prior art cascade wavelength interrogators are known from U.S. Pat. Nos. 7,127,132, 6,895,132, 6,788,835, 6,751,367, and 6,597,822 by Moslehi et al, which disclosures are hereby incorporated by reference.

FIG. 10 shows a block diagram for a prior art full authority digital engine controller (FADEC) 1001 of the prior art, where the FADEC 1001 reads engine sensors, which sensor values are used to generate control signals to regulate the functions of the jet engine 1002. The jet engine 1002 can be any of the family of internal combustion engines, which generate jet propulsion through a combustion process, including a turbofan, turbojet, turboprop, turbofan, or any such engine or its variants. The jet engine 1002 includes sensors and controls which are coupled to the FADEC 1001, including pressure sensors P0, Poil, PS3, PS13, P25, temperature sensors T12, T25, Tcase, T495, T3, TEO, and T5. The thrust control module (TCM) component of the FADEC includes pressure and rotational measurements for N1 (low pressure compressor) and N2 (high pressure compressor) of the jet engine, and also provides for engine Fuel Flow measurement sensors. Some of the examples of engine control include the Variable Bleed Valve (VBV), which controls the amount of air into the high pressure compressor, and the Variable Stator Vane (VSV) which controls the airflow through the high pressure controller. The High Pressure Turbine Clearance Control (HPTCC) adjusts the clearance between the turbine and frame to compensate for dimensional growth in the turbine fan blades, and the analogous Low Pressure Turbine Clearance Control (LPTCC) performs the same operation for the low pressure turbine as the HPTCC. An Ignition control generates an output for the initialization of the engine, and the Thrust Reverser control provides for movement of engine cowling, which provides for reverse-flow direction of the exhaust gasses. Various solenoids, including a Start fuel solenoid, provide for the initial introduction of fuel into the engine.

OBJECTS OF THE INVENTION

A first object of the invention is a cascade Optical Add Drop Multiplexer (OADM) sensor system having a final OADM preceded by a plurality of zero or more upstream OADMs preceded by a first OADM, each OADM having a source input, signal input, source output, and signal output, the source input of each OADM coupling optical power to the source output, each OADM adding measurement signal energy from a sensor port to measurement energy received on the signal input to form the signal output of each OADM, where a broadband optical source is coupled to the source input of the first OADM and an optical interrogator is coupled to the signal output of the final OADM.

A second object of the invention is a sensor Optical Add Drop Multiplexer (OADM) having a source input port, a signal input port, a source output port, and a signal output port, the source input port coupled to a splitter which provides some received optical energy to a circulator input port, and the remainder to the source output port, the circulator also having an output port and a sensor port, the circulator output port coupled to a combiner for adding the circulator output port to the signal input port to form the signal output port, the circulator sensor port coupled to a plurality of gratings responsive to unique wavelengths, the circulator coupling optical energy from the input port to the sensor port, the circulator also coupling energy from the sensor port to the output port.

A third object of the invention is a digital OADM having a source input port, a signal input port, a source output port, and a signal output port, the source input port coupled directly to the source output port, the signal input port coupled to a first circulator input port, the first circulator also having an output port and a grating port, the first circulator grating port coupled to a first end of a grating responsive to a particular wavelength, the grating having a second end which is coupled to the grating port of a second circulator, the second circulator also having an input port and an output port, the second circulator output port coupled to the OADM signal output port, the first circulator output port coupled to an optical to electrical converter for generating a serial stream of receive data, and the second circulator coupled to an electrical to optical converter having an optical interface at the same particular wavelength of the grating, the electrical to optical converter electrical interface coupled to a serial stream of data which may be either USB (Universal Synchronous Bus) data or Ethernet data.

A fourth object of the invention is a redundant fiber optic sensor ring having a plurality of OADMs, each OADM having as inputs: a clockwise primary input signal, a clockwise secondary input signal, a clockwise input source, a counterclockwise primary input signal, a counterclockwise secondary input signal, a counterclockwise input source, each OADM having as outputs: a clockwise primary output signal, a clockwise secondary output signal, a clockwise output source, a counterclockwise primary output signal, a counterclockwise secondary output signal, a counterclockwise output source, the plurality of OADMs arranged in a ring with each clockwise primary input signal, secondary signal input, and source input coupled to an adjacent OADM clockwise primary signal output, secondary signal output, and source output, respectively, each counterclockwise primary input signal, secondary signal input, and source input coupled to an adjacent OADM counterclockwise primary signal output, secondary signal output, and source output, respectively, each OADM selecting an active clockwise signal and an active counterclockwise signal from the clockwise or counterclockwise primary and secondary signals, respectively, each OADM adding optical energy at a unique wavelength, where for a sensor OADM, the optical energy added is associated with a local measurement which is either a fiber Bragg grating wavelength reflection at a unique wavelength, the Bragg grating reflection from the application of broadband optical energy from either the clockwise source or counterclockwise source, or for a digital OADM, the added optical energy is associated with a digital measurement which is provided at a unique wavelength as a serial stream of amplitude or phase modulated digital data, the digital OADM optionally also receiving a particular wavelength as an amplitude or phase modulated signal and converting this modulated signal to a stream of digital data.

A fifth object of this invention is a process for the temporal assignment and use of wavelengths in a multi-node optical loop, where the assignments are selected to minimize the latency and blocking through nodes of the optical loop when multiple messages are queued.

A sixth object of the invention is a Colorless Directionless Contentionless (CDC) optical node for a ring network, the CDC node receiving a plurality of messages on a plurality of wavelengths and forming a plurality of packets.

A seventh object of the invention is a Colorless Directionless Contentionless (CDC) optical node for a ring network, the CDC node accepting a plurality of messages and ordering them for transmission over a plurality of wavelengths to minimize a transmission finish time.

SUMMARY OF THE INVENTION

In a first embodiment of a sensor Optical Add Drop Multiplexer (OADM), a series connected cascade of sensor OADMs has local fiber Bragg grating (FBG) sensors connected to each local sensor OADM. The local FBG sensor for each local sensor OADM has a sensor string formed from an optical fiber having one or more sequential FBGs, each responsive to a unique wavelength, the local sensor having a single port and thereby forming a one-port string sensor. A sensor OADM is coupled to other sensor OADMs in a cascade configuration such that each sensor OADM has a broadband optical source input port, a broadband optical source output port containing optical power derived from the broadband source input port such as by using a splitter, a signal input port containing optical sensor responses from upstream OADMs, and a signal output port containing optical responses from the series of sensors attached to the instant OADM as well as from upstream OADMs coupled to a signal output port. The sensors of a particular OADM are energized by coupling optical energy from the splitter coupled to the broadband input source port, with the remainder of the splitter power directed to the sensor OADM source output port. The optical energy from the splitter is provided to a circulator having an input port as well as a sensor port and an output port, the circulator output port coupled to a combiner which sums measurement signals from the OADM sensor with measurement signals from the OADM signal input port to generate the OADM signal output port signal. The sensors attached to each sensor OADM have a plurality of fiber Bragg gratings (FBGs) which are disposed sequentially on a single fiber and coupled to the circulator sensor port. In this embodiment, optical energy from the broadband source is coupled by the splitter to the circulator, where the optical energy is transferred through the circulator sensor port to the sensor, reflected at unique wavelengths by the individual sensor gratings back to the circulator sensor port, where it is directed to the circulator output port which is coupled to a combiner and added with previous sensor responses from the OADM signal input port, thereby forming the OADM signal output port. A plurality of such OADMs, each having a source and signal input and output, may be cascade connected, the first OADM having a broadband optical source applied to the source input, and each subsequent OADM having its source input coupled to a previous OADM source output, each OADM having a signal input coupled to a signal output of a previous OADM, with each OADM responsive to a range of wavelengths, which range is further divided into a series of sensor wavelengths, each sensor wavelength operative using a particular Bragg grating of the series string of gratings, each of those individual gratings of the string sensor coupled to a particular parameter to be measured in a physical system.

In another embodiment of the invention for use with digital sensors, a digital OADM is provided which is fully compatible for use with the sensor OADM previously described. The digital OADM has an OADM broadband source input port directly coupled to an OADM broadband source output port (for compatibility with the sensor OADM), and an OADM signal input port coupled to an OADM broadband first circulator having an input port, an output port, and a grating port, the first circulator grating port coupled to one end of a fiber Bragg grating responsive to a particular wavelength, and a second circulator having an input port, an output port, and a grating port, the grating port coupled to the other end of the fiber Bragg grating, the output port coupled to the digital OADM signal output port. Optical energy at wavelengths other than the particular wavelength travels through the first circulator, grating, second circulator, and to the signal output. Optical energy at the particular wavelength is coupled to an optical electrical (OE) converter, deserialized, presented to a serial controller for framing, and then presented as one or more digital outputs. A series of digital sensors provide digital inputs which are formatted, presented to a serial controller, serialized, converted by an electrical to optical (EO) converter at the particular wavelength of the grating, and provided to the second circulator input port for coupling to the digital OADM output port, which adds to the local sensor responses to the upstream sensor signal responses provided to the digital OADM input port.

In a redundant ring embodiment, each sensor redundant OADM is arranged in a ring having sequential interconnections between OADMs from a first OADM to a final OADM which is circularly coupled back to the first OADM. One set of the interconnections carry optical signals in a clockwise (CW) direction, and another set of interconnections carry signals in an opposite counterclockwise (CCW) direction. The CW and CCW set of optical signals each include a primary signal and a secondary signal, which each OADM accepts as an input and also generates as an output, and a clockwise (CW) and counterclockwise (CCW) broadband source signal, which each OADM accepts and generates, where one or more broadband optical signal generators are present around the ring to provide multiple sources and directions for signals, and one or more optical interrogators are positioned to read the sensor responses.

In one embodiment of the redundant ring, each sensor redundant OADM has a signal degradation detector for each CW and CCW primary and secondary signals, the signal degradation detector selecting a particular primary or secondary OADM input signal as the active signal, adds the instant OADM sensor signals to the active signal, and couples the combined signal to the corresponding primary or secondary signal OADM output port. The sensor string of the particular OADM consists of a plurality of fiber Bragg gratings operating in a particular range of wavelengths, each sensor in its own unique wavelength range within the particular range of wavelengths, the sensor string having a single port and operative with reflective FBGs. By selection between the primary and secondary fibers and additional selection between the CW and CCW sets of these signals, an improved reliability sensor system may be provided.

In another embodiment of the redundant ring for use with sensors generating digital signals, the sensor string of the sensor redundant OADM is replaced by a single wavelength optical transmitter which generates an optical output at a particular wavelength. In this embodiment, a digital measurement input is received by a controller which frames, serializes, converts to the single wavelength optical signal, and outputs it to the digital OADM for addition to the other signals on the ring.

In one embodiment of the invention, sensing and control nodes are arranged in a circular loop, and information is transmitted from station to station using a plurality of available wavelengths from node to node. In another embodiment of the invention for use in a circular arrangement of nodes, each station transmits on a particular wavelength as determined locally by each node.

BRIEF DESCRIPTION OF THE DRAWINGS

FIG. 10 is a block diagram of a turbojet engine and controller according to the prior art.

FIG. 11A is the block diagram for an add/drop multiplexer responsive to a particular wavelength.

FIG. 11B is the block diagram of an optical transmitter/receiver responsive to a particular wavelength.

FIG. 11C is the block diagram of an add/drop multiplexer.

FIG. 11D is a block diagram of an optical transmitter/receiver.

FIG. 12 is an example table of sensor and control signal requirements for a FADEC system.

FIG. 13A is a block diagram for a four node optical loop.

FIG. 13B is a diagram of example communication flows of the optical loop of FIG. 13A.

FIG. 14A shows an un-optimized communications flow diagram for the topology of FIG. 13A and communication flows of FIG. 13B.

FIG. 14B is a diagram showing a first optimization of the communication flow of FIG. 14A.

FIG. 14C is a diagram of a second optimization of the communication flows of FIG. 14A.

DETAILED DESCRIPTION OF THE INVENTION

Figure 1:
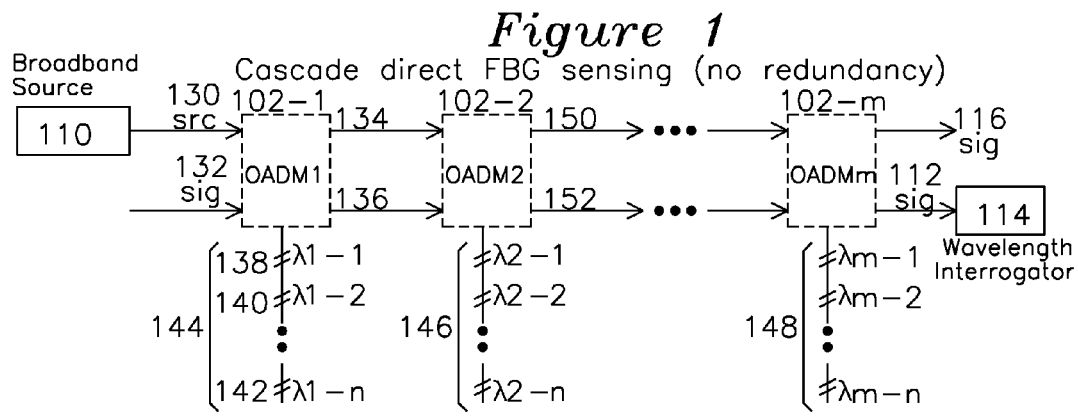
FIG. 1 shows a block diagram for a sensor OADMs or digital OADMs connected in cascade.

FIG. 1 shows a block diagram for a series of cascaded OADMs coupled to fiber Bragg grating sensors. Each block OADM1 102-1 OADM2 102-2 through OADM-m 102-m performs an optical "add drop" function, or alternatively an optical "add" function, whereby each OADM has a broadband source input port, a signal input port, a broadband source output port, and a signal output port. For the example first OADM1 102-1 shown in FIG. 1, the OADM1 has associated single port sensor 144 which operates in a first wavelength band, each sensor 138, 140, 142 uniquely operating at a particular wavelength within that wavelength band, with each sensor typically measuring a combination of physical parameters such as temperature, strain, or any measurement which may be made by an FBG. A broadband source 110 is coupled to input port 130 and contains broadband signal energy for use in stimulating the optical sensors 144, and also accepts a signal input port 132 which contains signals at wavelengths other than the first wavelength band of OADM 1 102-1, such as the responses from previous OADMs in the cascade chain. The first OADM 132 of a cascade OADM system may not have a signal input 132 excited with previous OADM energy, but is shown for clarity and consistency with other OADMs 102-2 and 102-m. The example OADM1 also generates a broadband source output 134, and a signal output 136 which contains the responses from the signal input 132 plus the responses from sensors 144, which are typically in a separate wavelength band from the upstream sensors. In this manner, each of the OADMs 102-1, 102-2, through 102-m accept broadband optical energy on a port such as 130, responses from upstream OADMs such as on port 132, and generate a broadband source output such as port 134, and generate a signal output 136 which contains the signal input 132 responses of upstream OADMs plus the sensor responses from sensor string 144. The final OADM 102-m generates a signal output 112 which contains the response of first OADM 102-1 and upstream OADMs 102-2, as well as the final OADM 102-m sensor 148 responses, which are present in signal output 112 and coupled to interrogator 114 for resolution of wavelength responses into associated physical measurements. Final OADM 102-m source output 116 is shown so final OADM 102-m is identical to the other OADMs for completeness and clarity, although final source output 116 typically does not contain optical power, as this would represent unused optical power that could have been presented to upstream stages.

Figure 2:
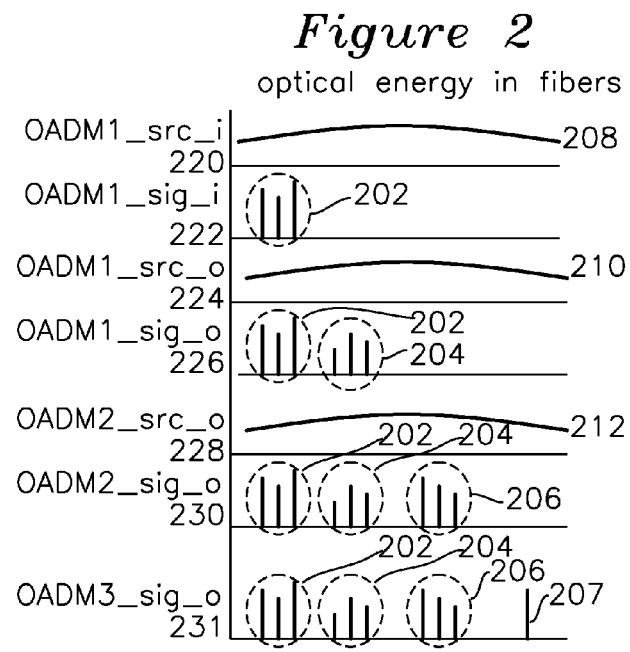
FIG. 2 shows an amplitude versus wavelength plot for the optical energy in the fibers of FIG. 1.

FIG. 2 plot 220 shows the broadband optical energy 208 which is provided such as source input port 130 of FIG. 1 and signal energy 202 such as from OADMs which precede OADM1 and which may appear on signal input port 132 of FIG. 1 as the optical responses 202 shown in plot 222. OADM1 broadband source output 210 (such as 134 of FIG. 1) contains the energy present in 208 less losses, such as the energy lost in sensors 144, and the signal output 136 is shown in plot 226, which shows optical sensor response energy 204 from sensor string 144 and the responses from upstream sensors 202 which were present on signal input fiber 132. Similarly, the second OADM 102-2 of FIG. 1 accepts the broadband output signal 134 shown as plot 212 of FIG. 2 from the upstream OADM1 102-1, and OADM2 generates a broadband output 150 shown as plot 228 and a signal output 152 shown as plot 230, which contains responses 202 and 204 from upstream OADM devices which precede the current OADM, and response 206 from sensor string 146. The sensor grating reflections represented in the optical energy at wavelength groups 202, 204, 206 are associated with a particular sensor OADM, the energy from each grating at a particular wavelength within a unique wavelength range, where the measurement from a physical grating can be resolved by measurement of the wavelength reflected. In another type of sensor known as a digital OADM, the optical energy is amplitude or phase modulated at a single fixed wavelength, represented as wavelength 207 of plot 231 showing the output of an example digital OADM3 which adds amplitude or phase modulated single wavelength energy 207 to the physically encoded reflection wavelengths 202, 204, 206 from example sensor OADMs. In this manner, each sensor OADM of the cascade receives broadband optical energy and signal response energy from previous sensors, and each sensor OADM directs some of the input broadband optical source energy to a locally attached sensor string which provides one or more wavelength responses which are added to the previously received wavelength responses to generate a signal output containing all such responses. A digital OADM transmits digital data on a unique single wavelength which is carried through the system along with optical energy from one or more sensor OADMs.

Figure 3:
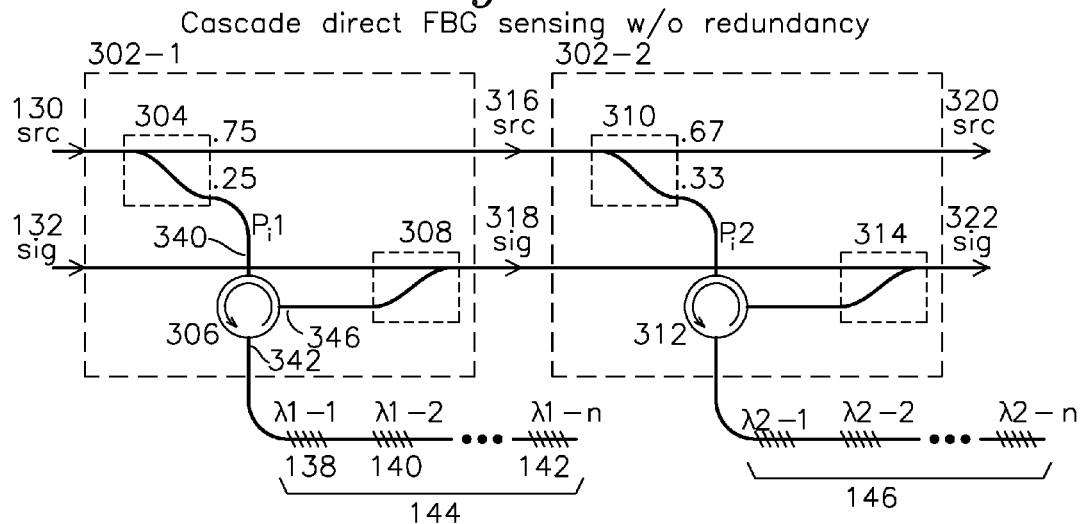
FIG. 3 shows a block diagram for sensor OADMs connected in cascade for use in FIG. 1.

FIG. 3 shows an example embodiment for two sensor OADMs of FIG. 1. A first OADM 302-1 and a second OADM 302-2 contain identical internal optical components. Broadband source input 130 is directed to a splitter 304 which provides a fraction of optical energy, shown as Pi1 of 0.25 the input signal, to a circulator 306 having an input port 340, output port 346, and sensor port 342. Energy from the splitter 304 is directed to circulator 306 input port 340, which directs this energy to the sensor string 144. Each of the gratings 138, 140, 142 of sensor string 144 operate in a unique region of a range of wavelengths within the wavelengths allocated to sensor string 144, and reflected energy from each sensor is directed to the sensor port 342 of circulator 306, after which it is directed to circulator output port 346, and the input port of combiner 308, where it is added to previous responses at signal input port 132, and directed to signal output port 318, which is applied to the signal input port of second OADM 302-2. The 75% balance of power from splitter 304 is directed to broadband source output port 316. Second sensor OADM 302-2 operates similarly using sensor string 146, and as with each sensor OADM, each wavelength within an FBG sensor is distinct from operating wavelengths of other FBG sensors, and each OADM operates over a range of wavelengths which is unique from other wavelengths. In one embodiment, where several cascaded OADMs are used, the splitters 304, 310 of each OADM each removes an equal amount of power for use by each sensor. For the case where there are n sensor strings, each sensor string having an identical number of sensors and an identical reflection efficiency compared to other sensors, the power to be applied to each sensor string is P/n. For the example case of 4 OADMs with identical sensor strings operating in unique wavelengths and a broadband input level of 0.1 W reference, and ignoring other losses, each circulator 306, 312, etc would receive 0.025 W of optical energy. The first splitter would remove 0.025 W from 0.1 W applied (0.25/0.75 split as shown for 304 of FIG. 3), the second splitter would remove 0.025 W from 0.075 W applied (0.33/0.67 split as shown for 310), the third splitter would remove 0.025 W from 0.05 W applied, and the fourth OADM would receive 0.025 W and use all of this energy.

Figure 4:
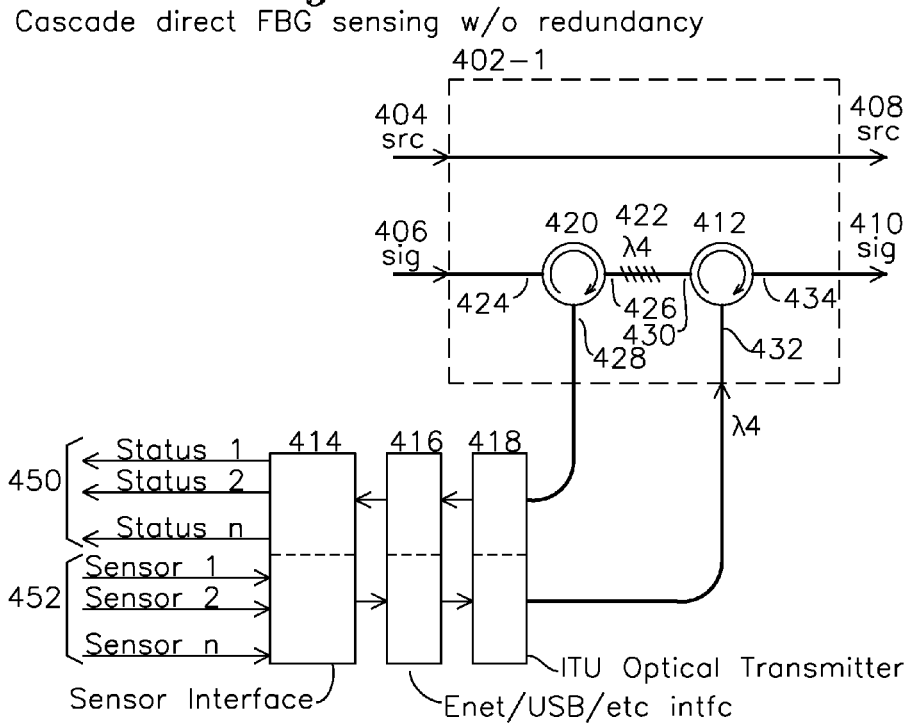
FIG. 4 shows the block diagram for a digital OADM coupled to a digital sensor, for use in FIG. 1.

FIG. 4 shows an example of a digital OADM for use with a digital sensor, providing a measurement as a binary word or other digital format. This digital format may be converted to any serial or frame-based protocol such as Ethernet using any of the IEEE local area network (LAN) standards, including in particular the IEEE 802 series of standards, more particularly including the 802.3 for Media Access Control (MAC). Another common serial format is Universal Synchronous Bus (USB), as described by the USB implementers forum www.usb.org. Either of these or other protocols may use a point to point or point to multi-point protocol, with each OADM response added to other sensor responses using a single amplitude or phase modulated wavelength which is unique from other wavelengths in use. As a convention in the diagrams which follow, optical paths are shown as thick lines and electrical or control paths are shown as thin lines. For an example Ethernet embodiment, a digital OADM 402-1 has a broadband source input port 404 which is directly coupled to the broadband source output 408 for compatibility with the OADMs of FIG. 3 and FIG. 1. The signal input port 406 is coupled to a first circulator 420 having an input port 424, an output port 428, and a grating port 426. Input port 424 energy is directed to grating port 426, and thereafter to grating 422, which reflects only optical energy at a 4 wavelength, which energy is returned to circulator 420 grating at port 426, and directed to output port 428 and to Optical to Electrical (OE) converter 418, which passes the electrical serial signal to Ethernet interface 416, which may include on the receive side a deserializer, MAC frame interface, and generate data or a data stream to sensor interface 414, which may provide outputs such as status or control bits 450. Sensors which provide output data in a digital form 452 are coupled to sensor interface 414, which provides this information to a frame interface 416 such as Ethernet, USB, etc, and this output is provided at a particular wavelength such as an ITU wavelength which is identical to grating 422 λ4 wavelength. The transmitter optical energy at this wavelength λ4 is applied to circulator 412 input port 432, which directs energy to grating 422 which reflects this λ4 energy back to the circulator grating port 430, which couples it to circulator output port 434 and to signal output port 410. Using the OADM 402-1 of FIG. 4, it is possible to combine the present digital OADM of FIG. 4 with the sensor OADMs of FIG. 3. This architecture thereby provides great flexibility in interfacing sensors of any type to the system.

In a typical use scenario for the sensor OADM of FIG. 3 and the digital OADM of FIG. 4, the OADMs are arranged in a cascade, with each subsequent OADM accepting a source input from a preceding source output, and each OADM accepting a signal input from a preceding OADM signal output. The first OADM in the cascade has a source input coupled to a broadband optical source, and since no signal input is applied to the first OADM, the signal input may be eliminated. For FIG. 3, one embodiment for a first OADM would be to couple circulator output 346 directly to signal output 318, and for FIG. 4, one embodiment for a first OADM would be to eliminate circulator 420, grating 422, the receive chain of 418, 416, 414, 450 (since the first OADM has no ability to receive information from an upstream OADM), so the transmitter output 432 is directly coupled to signal output 410. Similarly, the last OADM of the cascade has no source output, and the signal output would be connected to a wavelength interrogator of the prior art. Alternatively, for an expandable configuration, where OADMs could be added or removed up to a fixed number of OADMs, the splitters of each could be configured to provide a fixed power split, and the source input, source output, signal input, and signal output of each OADM provided for ease of addition and removal, such that each OADM may be used in any position in the chain, since each operates in a unique wavelength.

Figure 5:
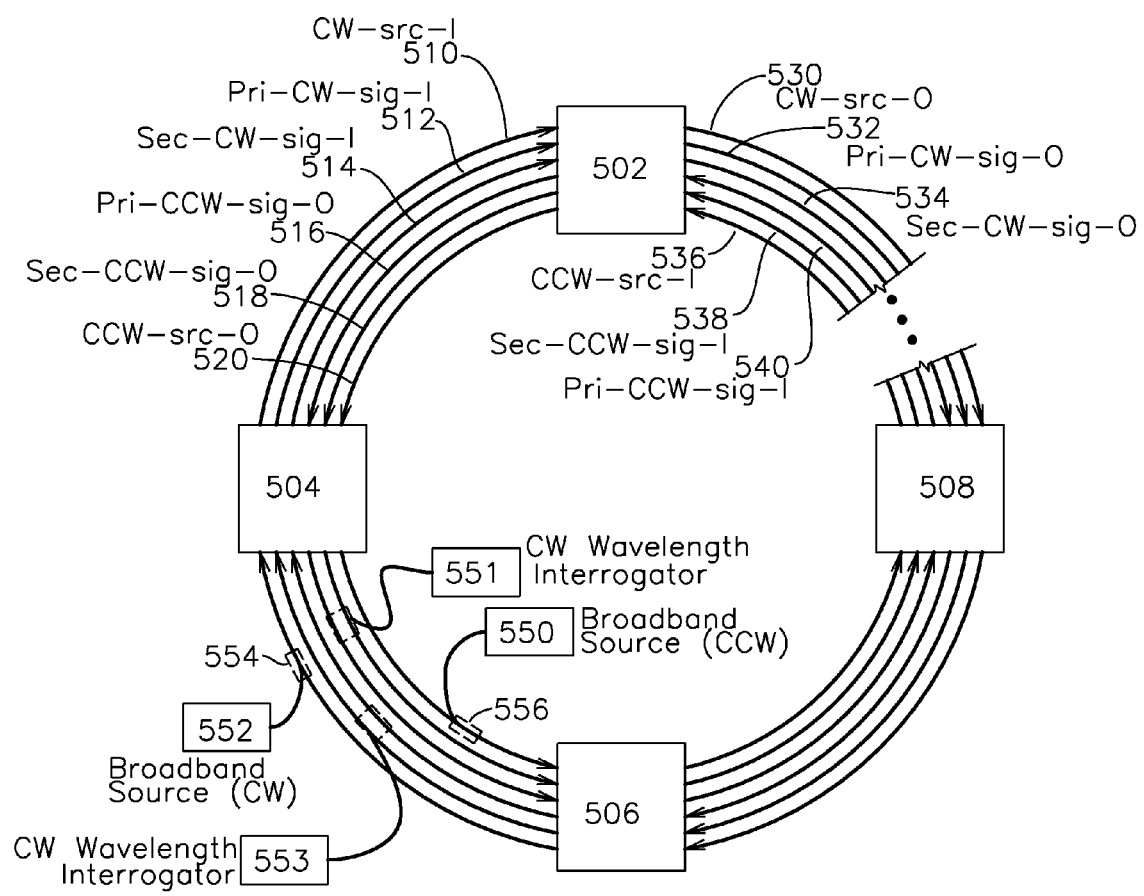
FIG. 5 shows a block diagram for a redundant sensor ring using redundant sensor OADMs or redundant digital OADMs.

FIG. 5 shows a redundant sensor ring, which includes a plurality of switching OADMs 502, 504, 506, 508, which sensor ring is expandable to any number of redundant OADMs. The signals for a particular redundant OADM 502 are labeled with respect to that OADM, and include clockwise (CW) propagating signals, counterclockwise (CCW) propagating signals, source (SRC) signals, sensor signals (SIG), inputs (I) and outputs (O), and primary (PRI) and secondary (SEC) signals, which function is used to form the signal names. The optical source signals are generated by one or more distributed broadband optical sources, shown as 552 using coupler 554 for the CW source fiber, and source 550 and coupler 556 for the counterclockwise direction. The sources and couplers for each direction may be located within each OADM, but is shown separately in FIG. 5 for clarity. In the example configuration, each OADM shown in detail for OADM 502 accepts a clockwise (CW) broadband source input CW-SRC-I 510, a CW primary signal input PRI-CW-SIG-I 512, a CW secondary signal input SEC-CW-SIG-I 514, a CCW primary signal input PRI-CCW-SIG-I 540, a CCW secondary signal input PRI-CCW-SIG-I 538, and a CCW source CCW_SRC_I 536. The output signals generated by OADM 502 are the primary clockwise signal PRI_CW_SIG_O 532, secondary clockwise signal SEC_CW_SIG_O 534, clockwise source CW_SRC_O 530, primary counterclockwise signal PRI_CCW_SIG_O 516, secondary CCW signal SEC_CCW_SIG_O 518, and CCW source output CCW_SRC_O 520. In this redundant configuration, the CW and CCW optical sources may be selected for use as an OADM optical source, and the sensor input/output signals use the primary or secondary clockwise or counterclockwise signal fibers, depending on the nature of the fault condition, if any. Signals placed on primary or secondary CW signal ring are coupled out of the ring and converted into physical measurements by CW wavelength interrogator 553 and signals placed on the primary or secondary CCW ring are coupled out of the ring and converted into physical measurements by CCW wavelength interrogator 551.

Figure 6:
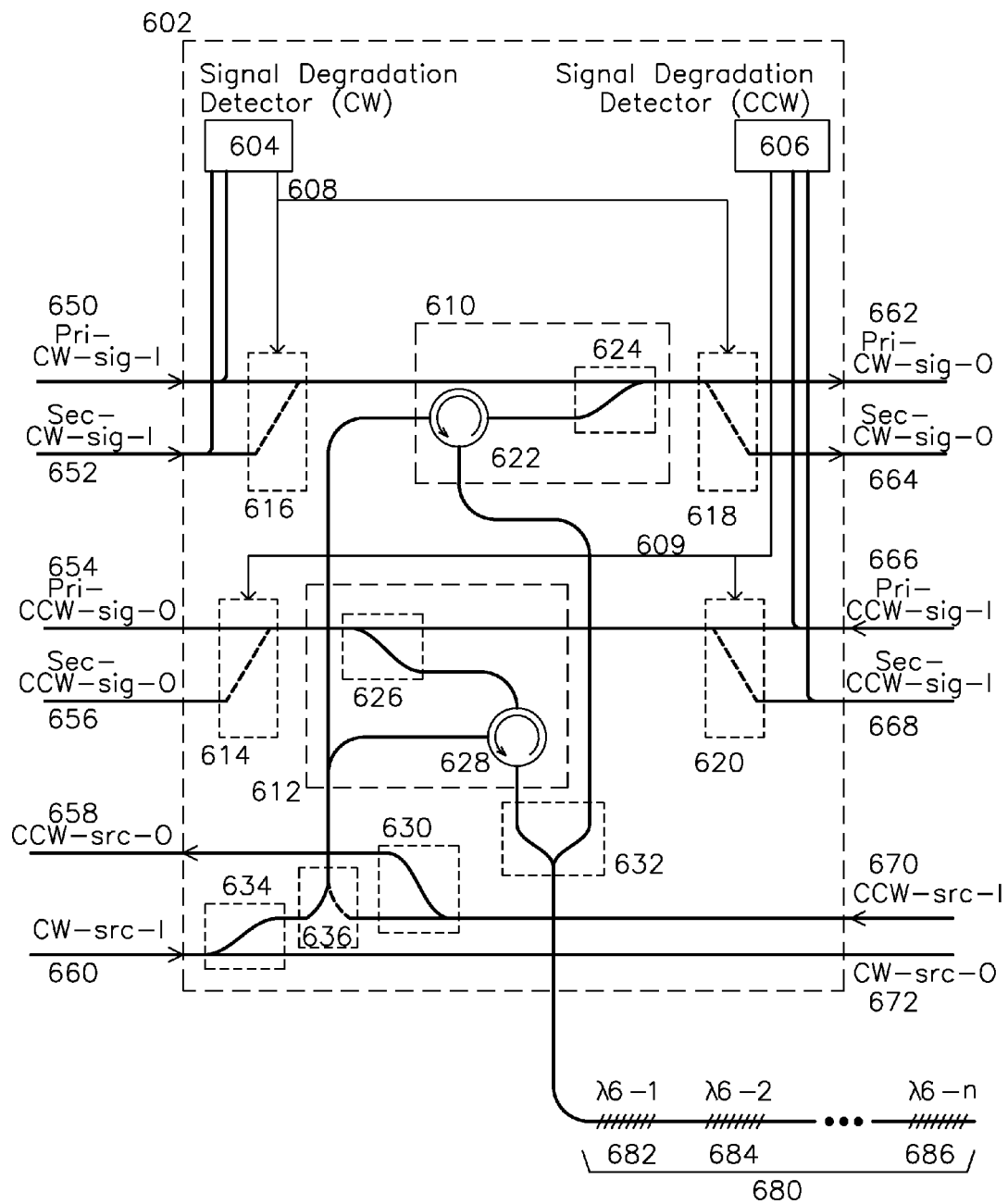
FIG. 6 shows a block diagram for a redundant sensor OADM for use in a redundant sensor ring, where the sensors are tunable fiber Bragg gratings.

FIG. 6 shows an example embodiment of a redundant sensor OADM 602 for use with an FBG sensor string 680, which may be understood in combination with the ring of FIG. 5. Thick lines represent optical paths, and thin lines represent electrical control elements. Each OADM receives a clockwise primary signal 650 and clockwise secondary signal 652, which contains the sensor responses of upstream redundant OADMs. Similarly, a counterclockwise primary input signal 666 and counterclockwise secondary input signal 668 are provided which contain sensor responses from the upstream sensors in the opposite direction. The clockwise primary output signal 662 and clockwise secondary output signal 664 are generated such as by using a selector 618 which selects a primary or secondary output, or alternatively using a splitter 618. Counterclockwise primary output signal 654 and counterclockwise secondary output signal 656 are similarly generated by 614 which may act as a single output switch or as a splitter which evenly divides the signal to be sent. In one embodiment of the invention, a signal degradation detector 604 for CW input signals and a CCW signal degradation detector 606 for counterclockwise signals are operative by examining an optical level on a primary or secondary signal to determine which signal is in use. If the primary CW input signal 650 is in use, the detector 604 asserts CW select signal 608 which instructs CW input signal selector 616 to select the primary path at input selector 616 and optionally at output selector 618, if 618 is a switch rather than a splitter which maintains signals at both primary and secondary outputs. Similarly, CCW signal degradation detector 606 examines primary and secondary input signals 666 and 668, respectively, and CCW select signal 609 is used to control switch 620 and optionally output switch 614, which may alternatively be a splitter. CW input source 660 and CCW input source 670 generate CW output 672 and CCW output 658, respectively, and one of the source inputs is selected 636. Considering the case where the CW source input 660 is selected, a fraction of the signal is split 634, selected 636, and applied to CW OADM 610, where circulator 622 directs broadband optical energy through combiner/splitter 632 to sensors 680, which return reflected FBG energy at a unique sensor wavelength for each sensor 682, 684, 686, and these are split 632, provided to circulator 622, combiner 624, and output to primary CW signal output 662 or secondary CW signal output 664. Similarly, CCW OADM 612 receives broadband source optical energy to circulator 628, which broadband energy is directed through splitter/combiner 632 to sensor string 680, returned to circulator 628, combined 626 and directed to the primary CCW signal output 654 or secondary CCW output 656, as required. Alternatively, 632 may operate as a switch, selecting between CW OADM 610 or CCW OADM 612, where only one OADM is CW or CCW path is active at a particular time.

Figure 7:
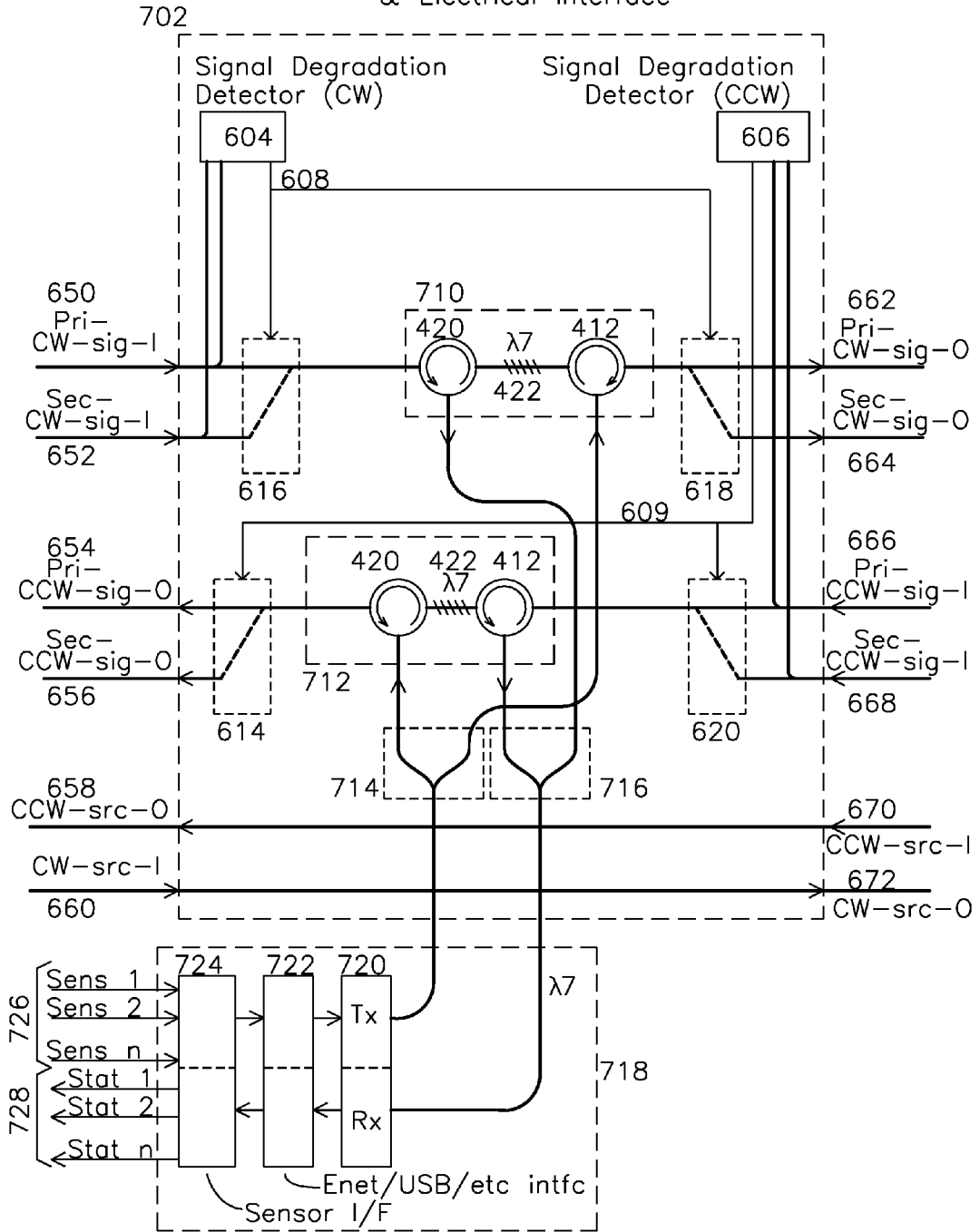
FIG. 7 shows a block diagram for a redundant digital OADM for use in a redundant sensor ring, where digital sensor signals are framed and serially transmitted as an amplitude modulated single wavelength.

FIG. 7 shows the redundant digital OADM 702 for use with digital sensor interface 718. The selection of an active path from CW primary 650 and CW secondary 652 using signal detector 604 which generates CW select 608 applied to switches 616 and 618 is as described for FIG. 6. The selection of CCW active path from CCW primary 666 and CCW secondary 668 using CCW signal detector 606 in combination with control signal 609 applied to CCW input switch 620 and CCW output switch 614 is also as described for FIG. 6. Digital sensor signals are applied to sensor interface 724 which frames the signals such as by concatenation, which packet is applied to serial framer 722, which may be Ethernet, USB, or any point to point or point to multipoint protocol, which generates a serial stream which is coupled to an electrical to optical (EO) converter 720, which provides narrowband modulation at wavelength $\lambda 7$, or optionally may be a wideband optical generator coupled to an FBG which only passes $\lambda 7$. This amplitude modulated serial optical signal is split 714 and passed to first OADM 710 and also second OADM 712, each of which operate as described for the signal path 406 to 410 of FIG. 4. Optical energy at wavelength $\lambda 7$ on either the CW active signal selected by switch 616 or CCW active signal selected by switch 620 are directed from first OADM 710 and second OADM 712 to combiner 716, where the λ7 wavelength amplitude modulated signal is applied to receive optical to electrical (OE) Rx interface 720, which serial electrical signal is framed by the receive section of framer 722, which provides the digital signal to sensor interface 724. Many variations of the processing of FIG. 7 are possible, however one example embodiment is shown for clarity in understanding the invention. For example, the ring may contain pairs of digital redundant interfaces 702 and 718 which operate in tandem, or the transmitter section and receiver section may be in physically separate locations. In one embodiment, the digital OADMs may operate as point-to-point pairs, such that two digital OADMs on the ring operate at the same particular fixed wavelength, resulting in one digital OADM transmitting at that particular wavelength over optical fiber which carries many other sensor measurements, the fixed wavelength digital information being received by another digital OADM which operates at the same wavelength. In this configuration, the two stations may transmit Ethernet packets such as the Transmission Control Protocol (TCP) of the Internet Protocol (IP) over a point-to-point link. In another example configuration, each digital OADM may have a transmitter part physically located near a sensor providing digital information, and a corresponding receiver part which is physically located near a point of measurement aggregation.

Figure 8:
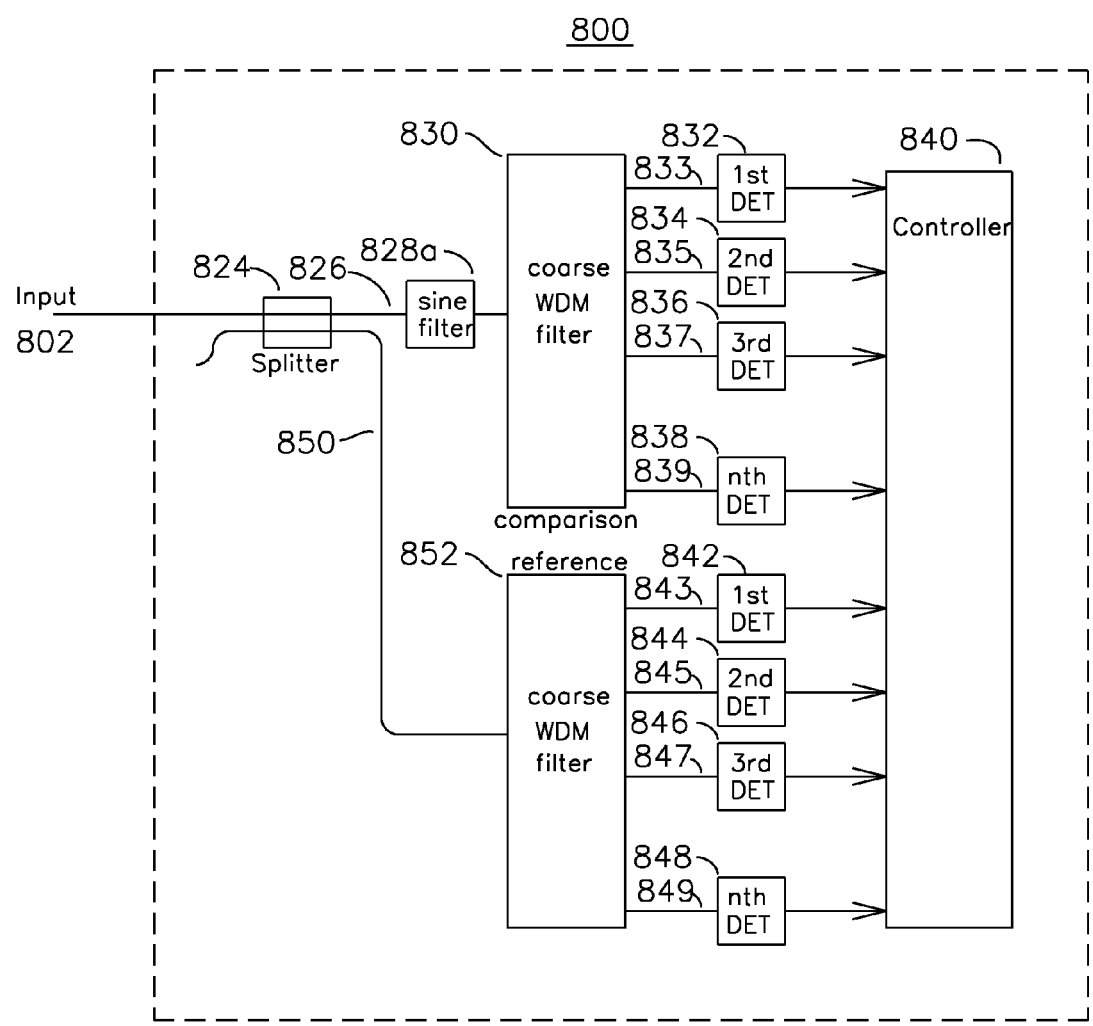
FIG. 8 shows a block diagram for a wavelength interrogator.

FIG. 8 shows one example of a wavelength interrogator 800. Optical energy to be interrogated for wavelength, such as the FIG. 1 signal 112 from final OADM 102-*m* applied to interrogator 114, or the interrogators 551 or 553 of FIG. 5, is applied to input 802. The incoming energy is applied to splitter 824, which splits into a first path through sine filter 828*a* to course WDM filter 830, and to a second path directly to coarse WDM filter 852 which has identical characteristics as filter 830. Each filter output 833, 835, 837, 839 of the first filter 830 and 843, 845, 847, 849 of the second filter 852 is coupled to a corresponding detector 832, 834, 836, 838 for the first WDM filter 830 and 842, 844, 846, 848 for the second WDM filter 852. The number of detectors is equal to the number of wavelengths to be interrogated, and in one embodiment, the detectors are read in pairs for a particular wavelength, such that for a wavelength responsive to 833 and 843 filter outputs, the detectors 832 and 842 are differentially read and compared. In this manner, the combined effect of the sine filter 828*a* and matched first WDM filter 830 and second WDM filter 852 provide discrimination as to which wavelength is present, which determination is made by controller 840 which is capable of reading multiple detectors and simultaneously resolving multiple wavelengths present at input 802.

Figure 9A:
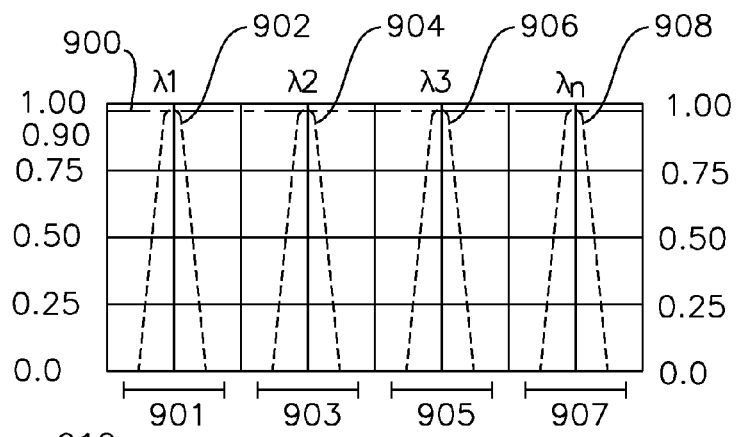
FIGS. 9A, 9B, 9C, 9D, and 9E show optical responses presented to the detectors of the wavelength interrogator.
Figure 9B:
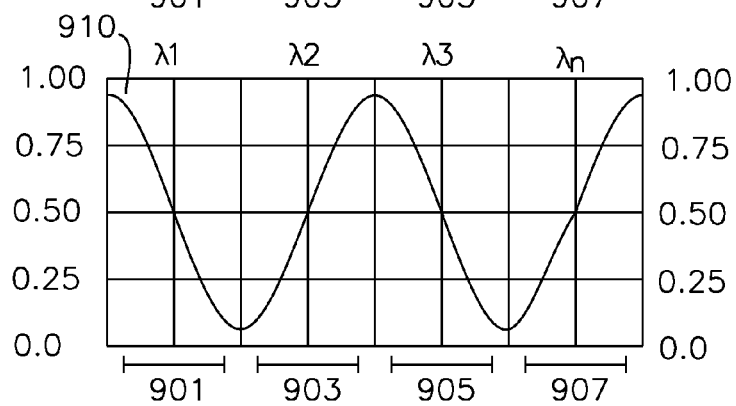
Figure 9C:
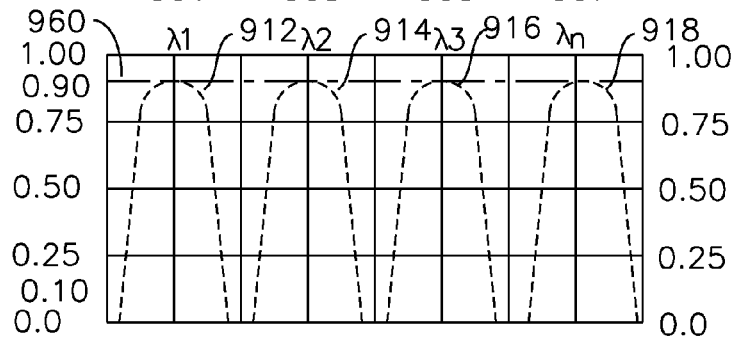
Figure 9D:
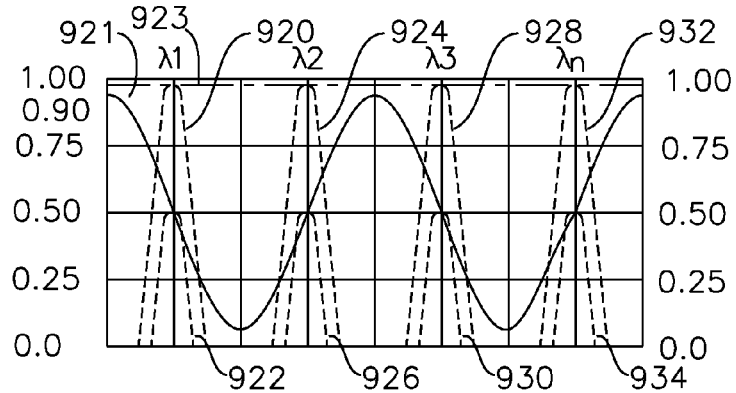
Figure 9E:
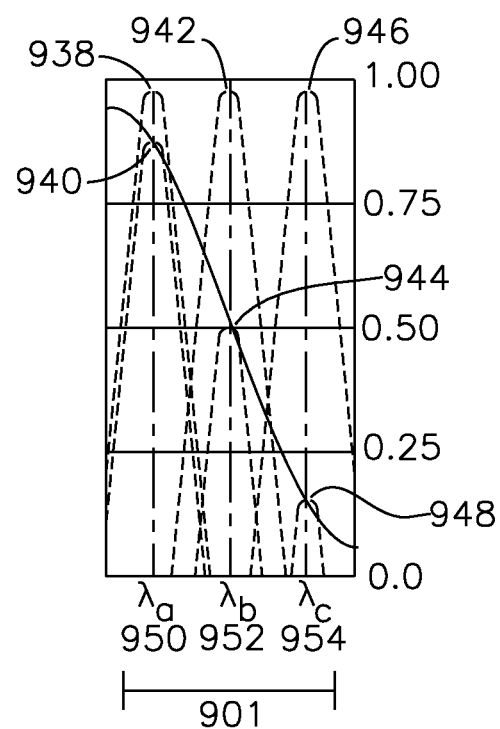

FIGS. 9A, 9B, 9C, 9D, and 9E show the operation under one embodiment of the interrogator 800 of FIG. 8. FIG. 9A shows an amplitude versus wavelength plot for the broadband source 900 with grating responses from sensors 902, 904, 906, 908, with each sensor providing a response at a particular wavelength. FIG. 9B shows the response of the sine filter 910, and FIG. 9C shows the response 912, 914, 916, 918 for WDM filters 830 and 852. When combined, the resulting amplitude responses are shown in FIG. 9D, with 920 representing the combined effect as seen at detector 842 of the second WDM filter 852 for the WDM filter 852 response 912 which results in grating response 920 at detector 842. In comparison, the combined effect of the sine filter 828*a*, first WDM filter 830 and grating response generates response 922. FIG. 9E shows the continuum of example detector 842 responses 938, 942, 946 for the first detector at a variety of wavelengths lambda a, lambda b, lambda c, and also the corresponding example detector 832 responses 940, 944, 948 for the same wavelengths. In this example embodiment, with knowledge of the sine filter characteristics and matched WDM filter responses which occur within the particular response wavelengths of the sensor gratings, it is possible to simultaneously interrogate many wavelengths and resolve each wavelength, which wavelength may subsequently be converted into a stress or temperature measurement. FIG. 8 shows one example wavelength interrogator for clarity in understanding the invention, but is not intended to limit the practice of the invention. Additionally, the optical sources used in the ring may include any known optical source including LEDs, optical lasers, or any source which provides optical energy over the operating range of wavelengths for the Bragg grating sensors. The broadband source may also include multiple sources operating over continuous or discontinuous wavelength ranges including 850 nm, 1200 to 1600 nm, or any other suitable optical wavelength range. Accordingly, the optical fiber may be single mode, multi-mode, or any optical fiber suitable for transmission of optical energy.

Returning to the example FIG. 10, a typical control system consists of controller FADEC 1001 which may have centralized or distributed components, and sensors and actuators largely located in engine 1002, with the system operating together to form a closed loop under control of a thrust input among the control inputs 1000 provided to the FADEC. In a centralized FADEC architecture, all control loop closures are done at the designated site location hosting the FADEC. Distributed control is a mechanism for an improved reliability implementation of systems engineering processes in aero-propulsion engine systems. The distributed control architecture is inherently more powerful, flexible, and scalable than a centralized control approach. Although the distributed FADEC architecture has many advantages over the centralized architecture, the potential benefits of the distributed architecture can be accrued only if the individual elements of this architecture are truly modular and generic, so that they can be used in multiple applications without any changes. Contrary to aggregating control computations at one node, such architecture distributes the control law processing burdens throughout the network, at various "smart nodes". The successful realization of such a distributed node-based control system provides significant modularity and scalability benefits to the distributed platform, and permits an affordable expansion of an existing FADEC or flight control system, or the assembly of a new system with these generic reusable smart nodes. Furthermore, the distributed architecture greatly reduces the system-wide impact of each and every obsolescence issue, or new technology-driven update cycles. Another significant consequence of this "distribution" of I/O among the smart nodes is the reduction of the heat load on the associated reduced-size FADEC, which in turn increases its reliability, and enables the development of the next generation of smaller FADECs, with reduced thermal load and greater opportunity for throughput capacity expansion.

There are three primary protocols in use for the communication of information between modules of the FADEC and the various sensors and controllers:

The first protocol is known as the "Time-Triggered Protocol" (TTP), which is relatively mature and widely-deployed architecture, supporting real-time avionic applications in the Time-Triggered Architecture (TTA), the original design and development of which dates from the 1980s. A fault-tolerant global time base is a critical requirement in time triggered operations. It is used to specify the interfaces among the nodes, to simplify the communication and agreement protocols, to perform prompt error detection, and to guarantee the timeliness of real-time applications. There are two classes of Time-Triggered Protocol (TTP), TTP/A and TTP/C, both of which use a Time Domain Multiple Access (TDMA) scheme for collision-free channel allocation. Messages, once injected into the channel, are broadcast to all end hosts. TTP/C is in widespread industrial use in the aerospace sector, including a number of on-board control systems in Airbus A380 and Boeing 787 aircraft.

The second primary protocol is the Time-Triggered Ethernet (TTE) Protocol, which improves on the earlier TTP by provisioning real-time and non real-time services over one single, coherent communication architecture. The TTE framing complies with standardized raw Ethernet messages. It distinguishes time triggered (TT) messages from event-triggered (ET) messages by the Type Field. ET messages receive best-effort service, a standard service provisioned by traditional Ethernet. By contrast, TT messages are characterized by temporal determinism and strict priority over ET messages. The two message classes are identical in frame structure and addressing conventions. The only difference is in the control imposed by a TTE switch. The TT messages are forwarded at scheduled slots, and preempt, if any, ongoing ET message transmissions. Regular ET messages, together with preempted ones, use Carrier Sense Multiple Access with Collision Detection (CSMA/CD).

The third primary communications standard is the Aeronautical Radio Incorporated Standard 825 (ARINC-825), which specifies Controller Area Network (CAN) connectors and wiring considerations, and is a form of a communication bus network which has been identified by airframe manufacturers as an important baseline network for aircrafts. ARINC 825 is considered to be an ideal data bus, since it offers many advantages such as low implementation cost, maximum interoperability, configuration flexibility, good error detection, and optimal bandwidth. The ARINC 825 standard was driven by Boeing and Airbus and defines communication standard for airborne systems using CAN. Data rates supported by ARINC 825 data bus are: 1000 kbit/s, 500 kbit/s, 250 kbit/s, 125 kbit/s, and 83.333 kbit/s.

The present invention utilizes an optical ring with distributed stations, which is referenced in the present patent application as an AViAtion real-Time Adaptive Ring (AVATAR), and in one embodiment of the invention is realized using an Ethernet over WDM architecture. The AVATAR system and assignment of optical wavelengths to communication messages is performed by Reconfigurable Optical Add/Drop Multiplexers (ROADMs) interconnected via multi-wavelength fibers which are capable of supporting a plurality of message channel wavelengths, such as in coarse wavelength division multiplexed (CWDM) or dense wavelength division multiplexed (DWDM) channel spacings where the communications of one channel occur simultaneously and non-interfering with the communications with adjacent channels. Two ROADM embodiments are presented using Add/Drop multiplexers shown in FIG. 11A or a Colorless, Directionless, Contentionless (CDC) device shown in FIG. 11B. Each ROADM is equipped with a number of tunable transceivers (add/drop pairs). In the add-drop multiplexer (ADM) model shown in FIG. 11C, the transmitter (add) and receiver (drop) of the same transceiver are tuned together in a pair-wise fashion such that the add channel is coupled to the same wavelength as the drop channel, whereby a signal at a particular wavelength λ of a node which is removed from the system is replaced by a different signal which is at the same wavelength λ. In contrast, the CDC model decouples the transmitter and receiver wavelengths, such that each can be tuned independently to different wavelengths, as shown in FIG. 11D. Express wavelengths are those that bypass a node, e.g., $\lambda_1$, $\lambda_2$ in FIG. 11C and $\lambda_1$ in FIG. 11D. In the example embodiment, an ideal tuning model is assumed, that is, transitioning from any configuration of the transceivers and express wavelengths to another can be done with negligible tuning delay. This ideal tuning model shows the advantages of balanced resources (wavelengths and transceivers), and provides for the design of optimal scheduling schemes.

In contrast to the single-channel broadcasting method in TTP, the AVATAR architecture exploits multi-channel access and spatial reuse in a WDM ring. Over the segment between a source and a sink, a wavelength is scheduled along with a continuous time interval which is used to transmit sensor/actuator messages packaged in Ethernet frames. By carefully assigning each wavelength and a time interval to a corresponding Ethernet frame, it is possible to achieve both real-time requirements (dictated by hard bounded delays) and efficient channel utilization.

In a fully-distributed aero-engine control system, control law processing and loop closure are expected to be performed at various nodes in the network instead of at one designated node as in FADEC architecture. Therefore, a general traffic model is used in the following examples which allows communication between any node pairs of the ring. As mentioned earlier, network traffic is expected to be Ethernet frames (also called packets), packaging the sensor data and actuator data from and to the associated sensors and actuators, and nodes which receive or generate this data. In a closed-loop engine control system, it is assumed that the traffic exhibits determinism, that is, the time evolution of the traffic can be predicted. As shown in the example of FIG. 12, network traffic of the present loop network can be periodic and specified by source, destination, and total message bits, such that the amount of data (measured in bits) generated per update interval is known and constant (non-varying temporally). In real-time control, it is required that all analog channels be sampled simultaneously to avoid phase lag during the digitization process, implications of which are estimated by assuming that delivery of messages from all control elements (even those used at lower update rates) occurs within the span of the fastest update interval of the system. For each sensor or actuator message, a continuous wavelength is assigned, with a transmitter at the source, with a receiver at the destination, and with a continuous time interval in which those resources are available to carry out the transmission.

In the time triggered protocol (TTP) architecture of the prior art, when the aggregated traffic volume increases, as when new control elements (nodes) are added, it is inevitable that all the nodes need to upgrade their operating line rate. In the AVATAR architecture of the present invention, however, using the wavelength programmable flexibility of ROADM, it is possible to progressively deploy more transceivers and energize new wavelengths as needed to add capacity, without replacing the Ethernet card at each node with higher line rates. Thus, the preferred scheduling algorithm will efficiently pack messages onto wavelength channels in a "load-balanced" way, such that the multi-channel advantages are properly exploited. The measurement metric to be optimized is the finish time, corresponding to completion time of transmission of all payloads.

The present examples assume the four node WDM ring of FIG. 13A with traffic request message flows described in FIG. 13B. Each traffic request is specified by source node ID, destination node ID, and Kbits/update (total message bits). The update rate of the present example is 100 Hz.

FIG. 14A shows a first schedule example where the packets are scheduled sequentially on a single wavelength, which provides a worst case value for finish time. In this example λ1 carries line rate≤11 Kbits×100 Hz=1.1 Mbits/sec while λ2 remains idle. All transceivers are parked on λ1 throughout the entire update interval (a frame). This naive serialized scheduling is effectively TTP, thereby providing a baseline example.

FIG. 14B shows optimal wavelength use under the resource configuration of 2 wavelengths and 1 transceiver at each node. Note that messages r3 and r4 are sent in parallel (simultaneously) to reduce the finish time. In this case, line rate≥10 Kbits×100 Hz=1 Mbits/sec, and transceivers at nodes 1 and 4 need to be tuned to λ2 at time 5 for the transmission of r4. Note also that the transceivers are the limiting resources that cause the under-utilization of wavelength resources.

FIG. 14C shows improved utilization of the wavelength resources by introducing one additional transceiver at node 1 and at node 4, so that more packet transmissions can be sent in parallel to further reduce the finish time. Note that an additional transceiver eliminates the contentions between $r_4$ and $r_1$, $r_2$ respectively at nodes 4 and 1, and thereby increases the utilization of wavelength resources. In this case, line rate≥6 Kbits×100 Hz=0.6 Mbits/sec, so the additional transceiver is assigned at nodes 1 and 4 to r4, and no transceiver reconfiguration is needed.

Thus, by careful scheduling and balanced resource configuration, the line rate is reduced from 1.1 Mbits/s→1 Mbits/s→0.6 Mbits/s in this example.

In another embodiment of the invention, a Mixed Integer Linear Program (MILP) packet scheduler is provided which provides optimal schedules for general resource configurations and traffic. Note that in the present patent application, wavelength λ is also referred to as W.

The parameters of the MILP scheduler are:
K is the number of packets.
N is the number of nodes.
W is the number of wavelengths.
$P_i$ is the number of transceivers at each node.
(sk, dk) is the source/destination pair of kth packet, hereafter referred to as jk.
$h_k$ is the packet length of $j_k$.
assume the following binary variables:
$\lambda_w^k$: 1 if and only if (iff) wavelength w is assigned to $j_k$.
$t_{wp}^k$: 1 iff the transmitter of transceiver p at node $s_k$ is assigned to $j_k$ and operates on wavelength w.
$r_{wp}^k$: 1 iff the receiver of transceiver p at node dk is assigned to jk and operates on wavelength w.
Also assume the following continuous variables:
l(k): launch time of $j_k$.
F: finish time.
Find a solution subject to the following constraints:

Constraint 1 (Wavelength/transceiver assignment): For each packet, that is, ∀k $$\sum_w \lambda_w^k = 1 \quad (1)$$

$$\sum_p t_{wp}^k = \lambda_w^k, \forall w \quad (2)$$

$$\sum_p r_{wp}^k = \lambda_w^k, \forall w \quad (3)$$

Constraint 2 (Link-conflict set): Two connections overlapping on links have to be either time-disjoint or wavelength-disjoint. Let $C_l$={(k,k')} be the link-conflict set, that is, ∀k,k', if $j_k$ and $j_{k'}$ share at least one link, then (k,k')∈$C_l$, and vice versa. Thereby, for all such pairs, time-disjointness or wavelength disjointness is enforced. That is, l(k)+$h_k$≤l(k') or l(k')+$h_{k'}$≤l(k) or $\lambda_w^k+\lambda_w^{k'}$≤1. These two constraints of the logical OR are correlated to a set of logical AND correlated linear constraints: ∀(k,k')∈$C_l$, $$l(k)+h_k-l(k')\leq M\cdot x_{kk'} \quad (4)$$

$$l(k')+h_{k'}-l(k)\leq M\cdot x_{k'k} \quad (5)$$

$$\lambda_w^k+\lambda_w^{k'}+x_{kk'}+x_{k'k}\leq 3 \quad (6)$$

where M is a large number, and $x_{kk'}$ is binary and forced to 1 if k finishes after k' starts.

Constraint 3 (Source/destination conflict set): Two connections sharing the same source/destination have to be either time-disjoint or transceiver-disjoint. Let $C_s^i$ and $C_d^i$ be the source/destination conflict set at node i, respectively. If k originates/terminates at node i, then k∈$C_{s/d}^i$. Applying the same technique as before, for ∀i, $$\sum_w t_{wp}^k + \sum_w t_{wp}^{k'} + x_{kk'} + x_{k'k} \leq 3, \forall k, k' \in C_s^i \quad (7)$$

$$\sum_w r_{wp}^k + \sum_w r_{wp}^{k'} + x_{kk'} + x_{k'k} \leq 3, \forall k, k' \in C_d^i \quad (8)$$

where $x_{kk'}$ is defined the same as in Eqs. (4) and (5).

Constraint 4 (Pairing-conflict set): This constraint only applies to the ADM model. In the formulation for the CDC model, this set of constraints is removed. The pairing-conflict set $C_p^i$ is defined as, ∀k,k', iff k originates at node i and k' terminates at node i, (k,k')∈$C_p^i$. For such pairs, a constraint ensures that, at any point of time, add/drop of the same pair are parked on the same wavelength, that is, ∀i,p, $$\sum_w \left(t_{wp}^k \vee r_{wp}^{k'}\right) + x_{kk'} + x_{k'k} \leq 3, \forall (k, k') \in C_p^i \quad (9)$$

Subject to the above constraints, the objective is to find the set of wavelengths which minimize the finish time, which may be expressed as:
Minimize:

$$F = \max_k \{l(k) + h_k\}$$

In this first embodiment of the wavelength selection algorithm, the solution set may require extensive computational resources as the number of stations and messages increases.

In a second embodiment of the invention, a fast and near-optimal heuristic is used which relies on reductions from Multi-Processor Scheduling (MPS) theory, and Circular-Arc Coloring (CAC) theory, respectively, to demonstrate the solution to the problem is NP-hard. The MPS problem is reduced with T tasks to schedule on M independent processors to a special case of the present problem, where W=P=M, and there are T packets to be scheduled, they all initiate at a node, traverse the whole ring, and terminate at the same node. The CAC problem can be reduced to another special case where W=P=1, and the circular arcs become packets with length 1.

Given this statement of the problem complexity, the next step is to use a heuristic algorithm to solve the general version of the packet-scheduling problem. The heuristic is devised to be simple, fast, near-optimal, and readily applicable to dynamic scenarios, wherein online scheduling of randomly arriving packets or circuit connections is needed. With these design imperatives in mind, an Earliest Finish-time, Least Variance (EFLV) heuristic is used to schedule packets one-by-one.

EFLV assigns resources based on current network state, which is defined in terms of the following variables which capture the network state:

$E(w,i)$ is the earliest time to transmit a packet that bypasses node i on wavelength w.

$T_i(w,p)/R_i(w,p)$ is the earliest time the transmitter/receiver of transceiver p can be used to transmit a packet from/to node i on wavelength w.

The present heuristic algorithm is implemented using stations with add-drop multiplexers (ADM ROADM of FIGS. 11A and 11C), since the CDC model requires only minor modifications. Similar to Multi-Processor Scheduling, packets are first sorted in decreasing order of packet length, and then processed one by one. For each packet, EFLV assigns a wavelength, a transmitter/receiver at source/destination respectively, and a continuous time interval. According to the principle of earliest finish time, EFLV seeks to assign wavelength that allows earliest start of the packet transmission, that is, $$l(k) = \min_w \left\{ \min_p T_{s_k}(w, p), \min_p R_{d_k}(w, p), \max_i E(w, i) \right\} \quad (10)$$

where i's are the nodes bypassed by packet k. The time interval allocated, therefore, is $[l(k), f(k)]$, where $f(k)=l(k)+d_k$. The wavelength that gives the minimum $l(k)$ then is assigned to packet k.

In an alternative embodiment, Least variance implies assigning the transmitter/receiver that, while not exceeding $l(k)$, differs least from $l(k)$, that is:

$$\max_p \{T_{s_k}(w_k, p) \le l(k)\} \quad (11)$$

$$\max_p \{R_{d_k}(w_k, p) \le l(k)\} \quad (12)$$

and where $w_k$ is the wavelength determined in Eq. (10). This is used because when multiple transceiver pairs are available for the earliest packet transmission, it is desirable to spare those "less loaded" pairs for future allocation, since transceiver resource is relatively scarce.

Following each resource allocation, $E(w, i)$, $T_i(w, p)$, and $R_i(w, p)$ are updated accordingly. Updates are detailed as follows:

for $\forall i$ along the path from $s_k$ to $d_k$:

$$E(w_k, i) := f(k) \quad (13)$$

$$T_i(w_k, p) := \max\{f(k), T_i(w_k, p)\}, i \ne d_k, \forall p \quad (14)$$

$$R_i(w_k, p) := \max\{f(k), R_i(w_k, p)\}, i \ne s_k, \forall p \quad (15)$$

and where each source has the additional updates:

$$T_{s_k}(w, p_k) := \max\{f(k), T_{s_k}(w, p_k)\}, \forall w \quad (16)$$

$$R_{s_k}(w, p_k) := \max\{f(k), R_{s_k}(w, p_k)\}, \forall w \ne w_k \quad (17)$$

with each destination similarly updated. For the CDC model, each station transmitter and receiver are decoupled, therefore there is no need to update the receivers at the source or the transmitters at the destination. The overall algorithm is summarized below:

Algorithm 1 EFLV:

Step 1) Initialize all $E(w, i)$, $T_i(w, p)$, $R_i(w, p)$ to 0.

Step 2) Sort the packets in decreasing order with respect to (wrt) $h_k$.

while List not empty do
1. Pick the first packet, calculate $l(k)$ in Eq. (10) and assign wavelength and transceivers according to Eqs. (10)-(12).
2. Update E, T, R according to Eqs. (13)-(17).
3. Remove the packet from list.
end while Step 3) Output $\max\{l(k)+h_k\}$ with the wavelength and transceiver assignment for each packet.

The algorithm described above was evaluated experimentally using a unidirectional ring network of 8 nodes, with 20 packets to schedule, the lengths of which are integral and drawn from a uniform distribution over [1, 10]. The traffic profile has a minimal schedule length of $\max_k h_k = 9$, when all packets are transmitted in parallel, and a serialized schedule has length of 109 in the TTP architecture. In the first set of numerical evaluations, the scheduling performance was compared under different network configurations determined by the number of wavelengths per link and transceivers per node, and the ROADM technology. Then, the performance of the EFLV heuristic was evaluated against the optimal MILP solution. Finally, EFLV was used to draw a comprehensive performance report as design guidelines.

Figure 11E:
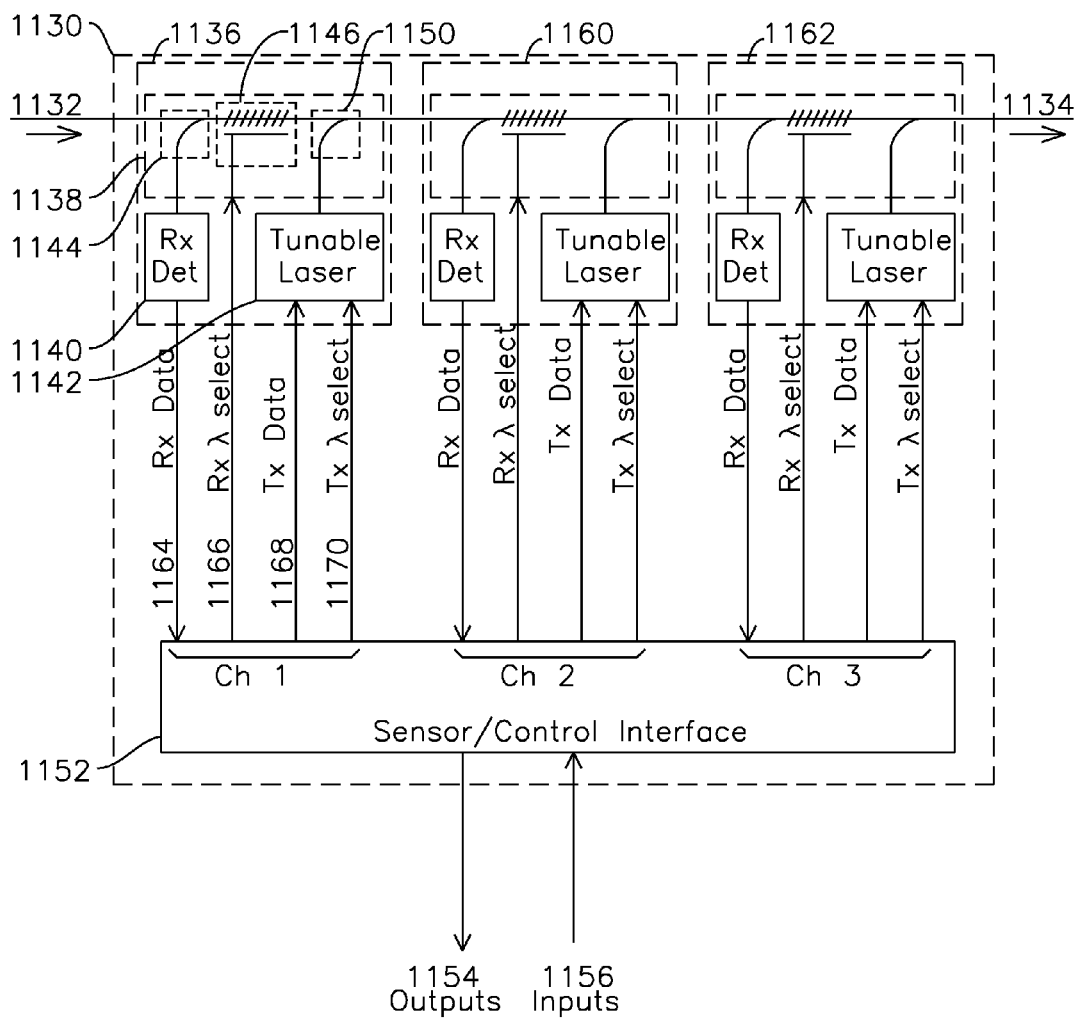
FIG. 11E is a block diagram of a CDC optical node.

FIG. 11E shows one example embodiment of a CDC node configured in a ring such as 1302, 1304, 1306, 1308 of FIG. 13A, and operating with an engine with sensors and controls such as FIG. 10 with the subset of distributed sensors described in FIG. 12. Each CDC ROADM node 1130 of FIG. 11E further has a plurality of optical nodes, one for each wavelength in use and shown for the case W=3 with optical nodes 1136, 1160, and 1162, each of which is separately tunable for transmit and receive wavelength, and each wavelength supporting an independent communications channel such that multiple wavelengths can be used simultaneously and without interference from one wavelength channel to the next. Input optical energy 1132 is delivered to the node in a variety of wavelength channels and output optical energy 1134 is emitted in wavelength channels. Each optical node has an individually tunable receiver, shown in the present example as tunable grating 1146, which reflects selected wavelength energy back to coupler or circulator 1144 to receive detector 1140, which converts the modulation of the selected wavelength to Rx Data 1164 to the sensor/Control interface 1152. Rx X select 1166 determines the wavelength of reception of channel 1 grating 1146 and Tx X select 1170 determines the wavelength of transmission of the tunable laser 1142 according to the previously described CDC solution set of the above equations, and these wavelength select signals are accompanied by Rx Data 1164 being received by a particular node channel and Tx Data 1168 being emitted by a different particular channel. Channel 2 optical node 1160 and channel 3 optical node 1162 operate similarly. The node 1130 includes Sensor/Control interface 1152 which contains the wavelength selection algorithm described above, implemented on a computer or other state machine, from which outputs 1154 from the receive channels and associated inputs 1156 may be transmitted to, or received from, remote nodes, including distributed FADEC nodes. In one embodiment of the invention, a particular transmission channel and wavelength schedule is distributed across all of the nodes of the network for use by controller 1152, and in another embodiment of the invention, the schedule and wavelengths are computed by each node based on a current or observed traffic pattern. Each channel of CDC node 1130 thereby operates on a separate transmit and receive wavelength, and each optical node 1136, 1160, and 1162 may thereby be placed in an "express mode" where one or more wavelengths pass from input 1132 to output 1134, and each optical node may receive and transmit at the same or different wavelengths according to the optimization result of the above equations.

Figure 11F:
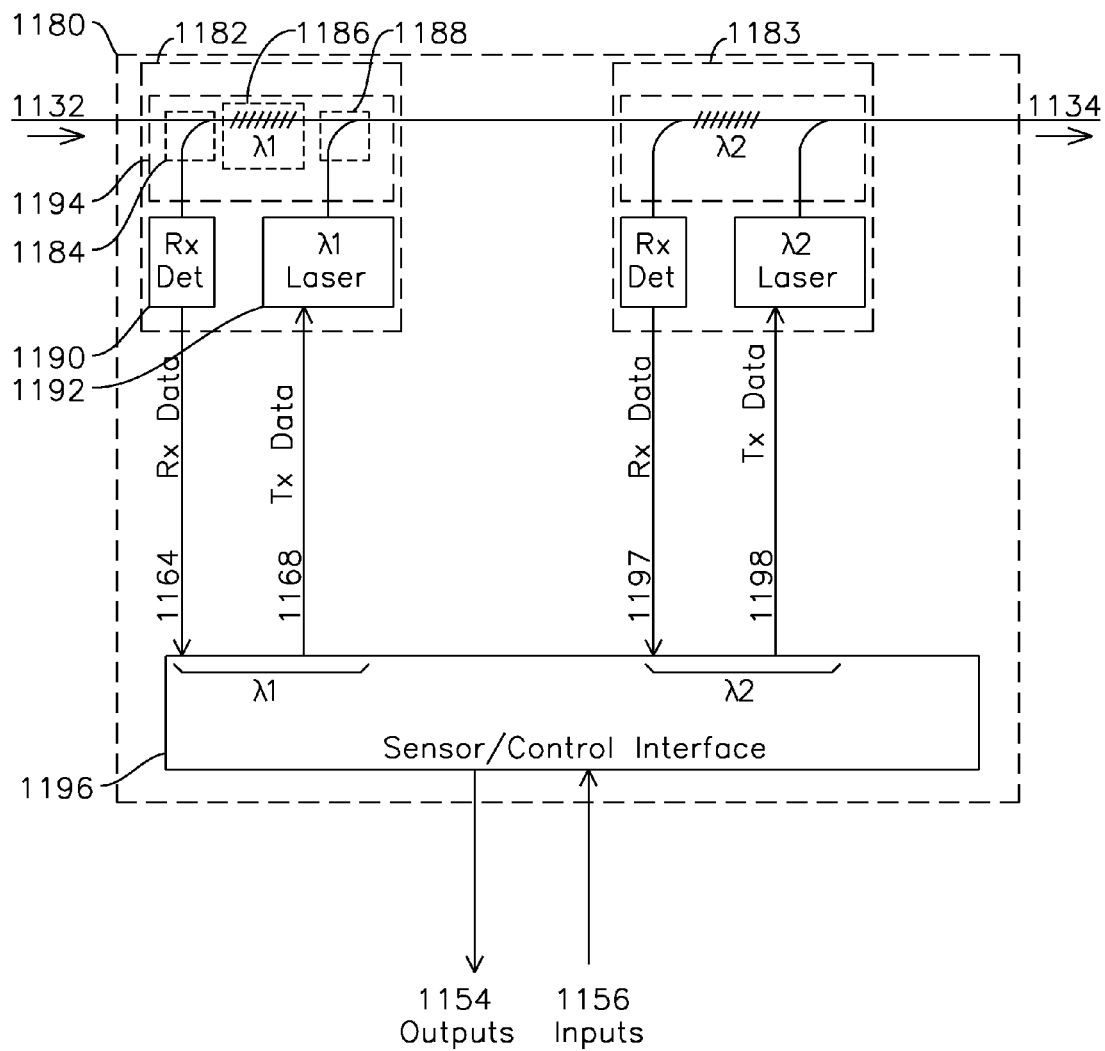
FIG. 11F is a block diagram of a CDC optical node.

FIG. 11F shows another embodiment of the invention where node 1180 is operated as a CDC ROADM, and has fixed transmit wavelength laser 1192 and fixed receive wavelength detector 1190 operating in conjunction with fixed Bragg grating 1186 which reflects only λ1 to detector 1190 and passes other wavelengths to the subsequent optical node 1183, which is responsible for receiving modulation at wavelength λ2 and transmitting modulation on wavelength λ2. The optical nodes 1182 and 1183 thereby operate as CDC nodes by removing modulated information on wavelength λ1 and injecting it into λ2 using the second optical node 1183. An "express" wavelength may either pass through node 1180 by virtue of not being a wavelength channel which is reflected by optical node 1182 or 1183, or it may be treated as an express wavelength by coupling Rx Data 1197 to Tx Data 1198 for the duration of the packet.

In an alternate embodiment, the node of FIG. 11F may be operated in an ADM ROADM mode of operation, each optical node 1182, and 1183 being used as a fixed conventional add/drop multiplexer, and with each optical node 1182 removing messages encoded on a particular wavelength and adding messages encoded on that same particular wavelength, as was described for FIGS. 11A and 11C.

Figure 15:
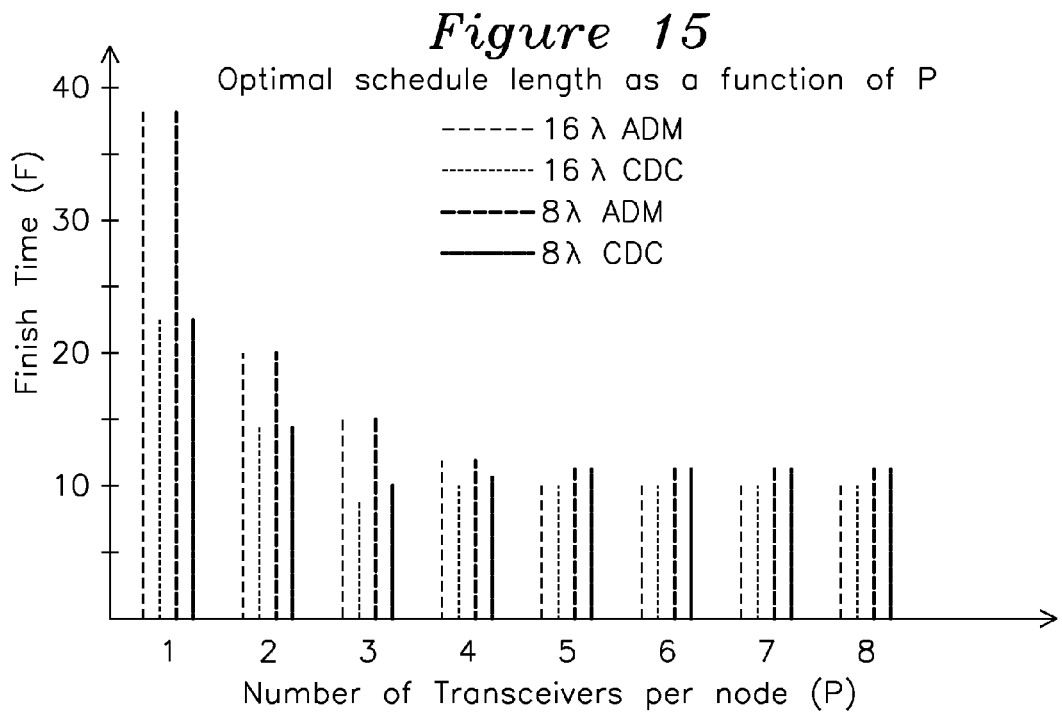
FIG. 15 is a plot of optimal schedule length as a function of P.
Figure 16:
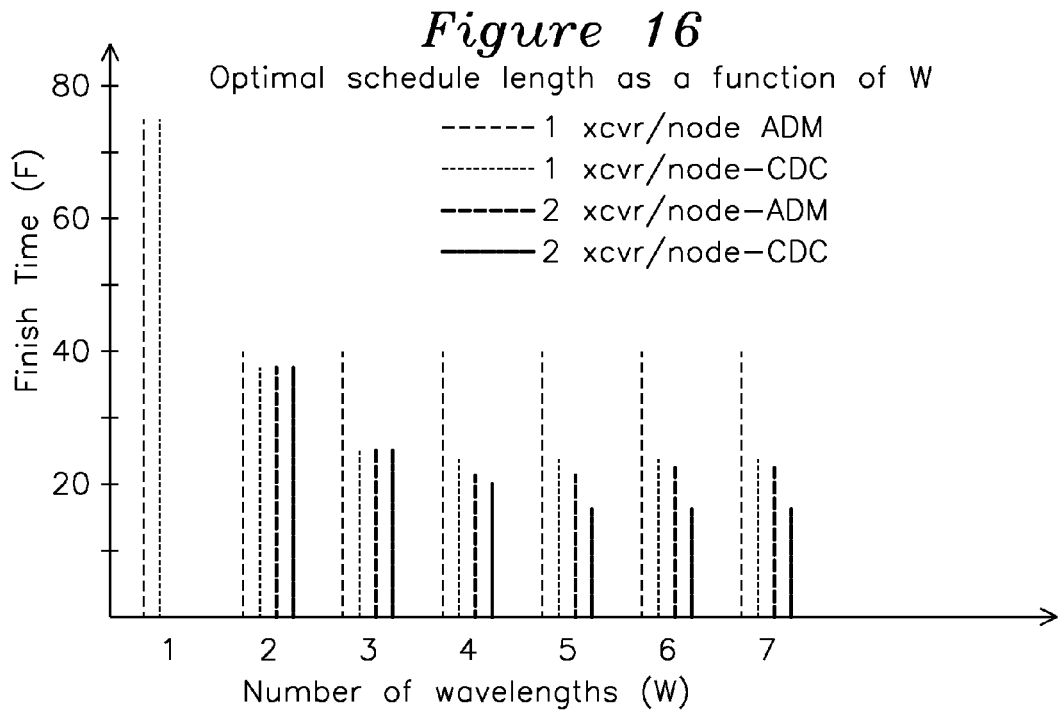
FIG. 16 is a plot of optimal schedule length as a function of W.

FIG. 15 shows the relationship between optimal schedule length and P where the number of wavelengths W=16, 8, and shows the finish time as a function of P. In all four cases, a decrease of finish time as P increases is observed, which corresponds with the general observation that more resources render better performance. Examining the case of ADM ROADM with 16 wavelengths, it is seen that when P=1, the wavelength resource is over-provisioned. The lack of transceiver resources limits the packets from tapping into the wavelength capacity. As P is increased to 2, finish time is significantly reduced, by about 50%. As P further increases, an amortized gain can be seen as the wavelength has become the limiting resource. In other words, wavelength resources are saturated after a certain point. CDC ROADM renders better performance compared to ADM ROADM under the same resource configuration. In addition, the scheduling performance using CDC ROADM converges faster to the lower bound limited by the number of transceivers as seen in FIG. 15, or by the number of wavelengths as seen in FIG. 16. The decoupling of transmitter and receiver in CDC architecture translates into better utilization of both, as well as wavelength resources.

Figure 17A:
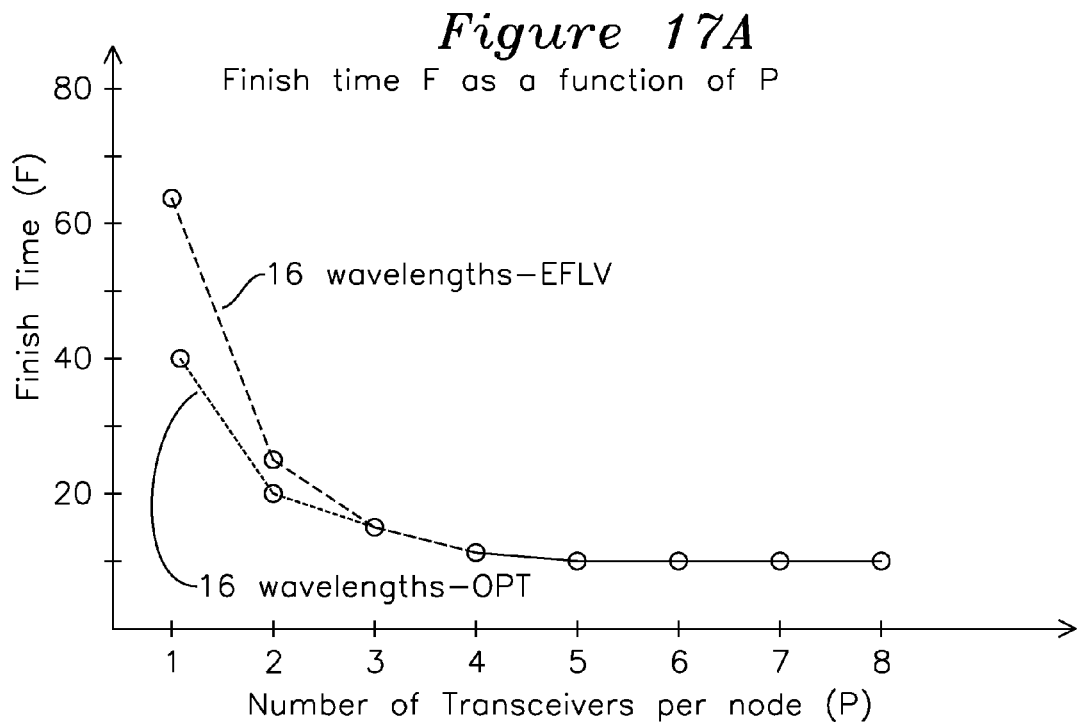
FIG. 17A is a plot of finish time F as a function of P.
Figure 17B:
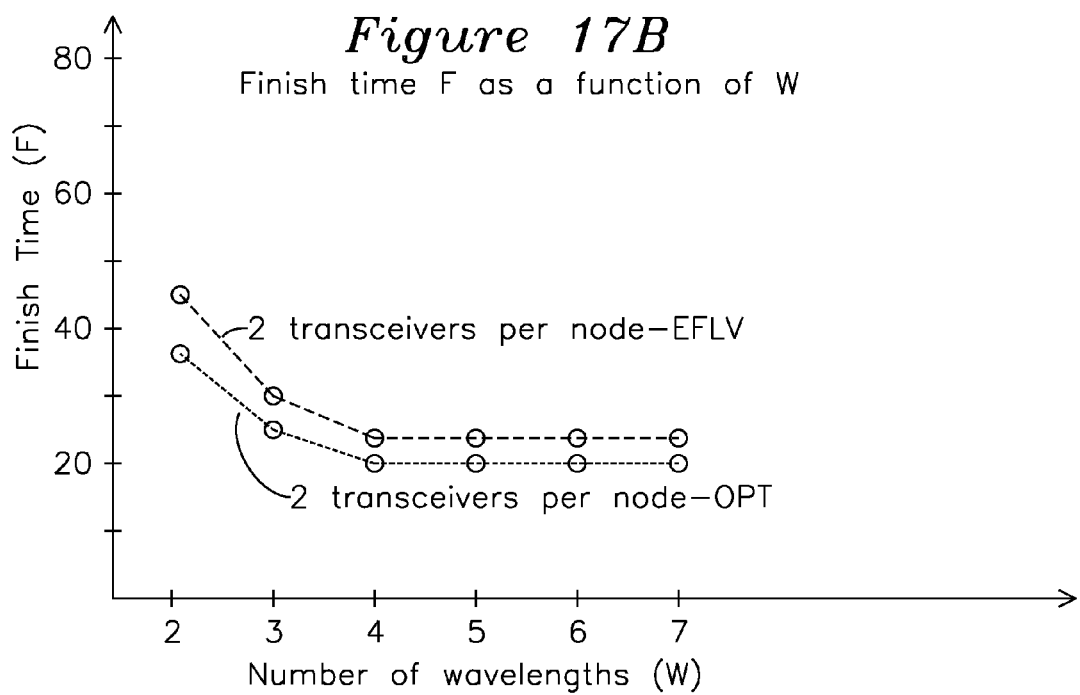
FIG. 17B is a plot of finish time F as a function of W.
Figure 18A:
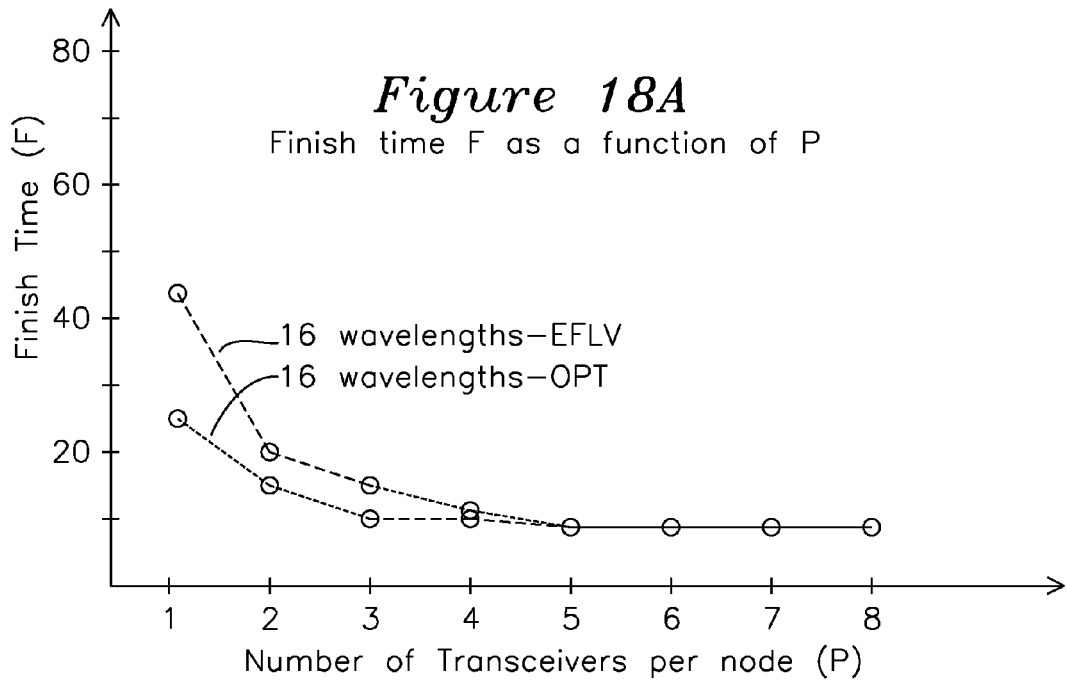
FIG. 18A is a plot of finish time F as a function of P.
Figure 18B:
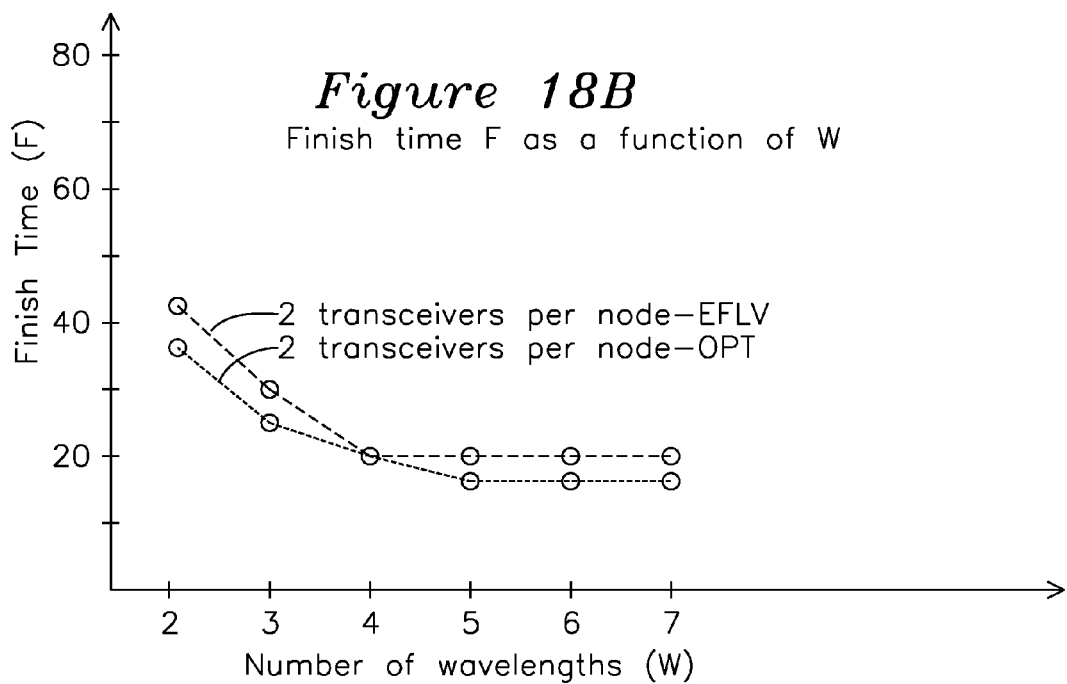
FIG. 18B is a plot of finish time F as a function of W.

In FIG. 17, the interaction between finish time and number of wavelengths while fixing the number of transceivers per node can be seen. P is shown for the cases of 1 and 2 transceivers per node, for the case of avionics applications where a node is not likely to equip more than 2 transceivers. It is understood that any number of transceivers P per node may be used, or any number of wavelengths W per node, however. The same observations can be made as in FIG. 15. It is worth to note that, even with a conservative resource configuration (W=2, P=1), which is equivalent to a dual-channel TTP with spatial reuse, the AVATAR system of the present invention is able to achieve more than 65% decrease in finish time.

The next set of graphs show the performance of the EFLV heuristic in light of the optimal scheduling generated by solving the MILP. Results for ADM and CDC ROADM model are shown in FIGS. 17A and 17B, and FIGS. 18A and 18B, respectively. In particular, FIG. 17A draws the comparison of varying P, while FIG. 17B of varying W. The EFLV heuristic in most cases gives optimal or close-to-optimal scheduling. The one exception lies in the case of P=1. Scheduling performance in this case is largely limited by transceiver resource. It is intuitive that constrained resource configuration requires more scheduling sophistication.

Due to the high computational cost of solving the MILP for near-optimality of EFLV scheduling, EFLV is used to draw performance as function of both W and P. The flexible CDC model generally outperforms the ADM model. AVATAR is reduced to single-channel TTP with spatial reuse when W=1, P=1.

In the particular base case of W=1 and P=1, the CDC model is equivalent to the ADM model. Significant reduction in finish time is observed with immediate increase of resources to the base case. Given a resource budget and performance criteria, it is possible to trade off between wavelength and transceiver resources using the algorithms provided to find the optimal operational point for a given network configuration.

As can be seen in the preceding embodiment, AVATAR based on an optical WDM ring provides many performance advantages for aero-engine control network architectures which use ring topologies. The scheduling algorithms of the present embodiments take advantage of the vast capacity provided by WDM technology to support hard real-time avionic services. The scheduling problem may be described using the MILP model for two different ROADM architectures, namely, the Add/Drop multiplexer (ADM) pair model and Colorless, Directionless, Contentionless (CDC) model. The CDC ROADM architecture removes the pairing constraint and results in a more relaxed formulation. The simple scheduling heuristic Earliest Finish-time, Least Variance (EFLV) proposed may be implemented in many different manners. EFLV may be implemented as a control mechanism, using exhaustive search to provide near-optimal scheduling in both ROADM models.

It can be seen from the embodiments and figures described herein that the architecture and embodiments of the AVATAR implementation provides a significant improvement over the Time-Triggered Protocol (TTP) architecture for use in avionic applications. Using the most conservative resource configuration, AVATAR was shown to achieve more than 65% temporal efficiency compared to TTP. Tradeoffs between spatial resources (wavelength and transceivers) and temporal performance (finish time) are required for each specific system for optimal operation.

We claim:
1. An optical ring having a plurality of nodes, each node having an output coupled to a subsequent station and an input coupled to a previous station, said optical ring supporting simultaneous communications in a plurality of separate wavelengths forming separate communication channels;
   each said node having:
      a tunable drop filter dropping a first wavelength from an optical node input and a tunable add filter optionally adding a second wavelength to said optical node output, said first wavelength and said second wavelength operative in different optical communication channels, each said tunable drop filter coupled to an optical receive detector and each said tunable add filter coupled to a tunable laser operative on a particular channel;

a sensor and control interface for converting sensor data received on a particular optical channel into sensor reading outputs and also converting control input data into modulations on a particular channel, said sensor data and said control inputs having a length;

a scheduling and wavelength assignment controller for placing said control inputs onto particular wavelengths and for retrieving said sensor reading outputs;

and where each said node is a Colorless Directionless Contentionless (CDC) node utilizing said plurality of wavelengths operative to minimize a finish time.

2. The ring network of claim 1 where the wavelenth of said tunable laser is seperately determined for each message having said finish time.

3. The ring network of claim 1 where said tunable drop filter utilizes tunable Bragg gratings operative on a wavelength determined for each message having said finish time.

4. The ring network of claim 1 where said utilizing said plurality of wavelengths operative to minimize a finish time includes the assignment of messages to wavelengths using either a Mixed Integer Linear Program (MILP) scheduler or an Earliest Finish-time, Least Variance (EFLV) scheduler.

5. The optical ring of claim 1 where each said tunable drop filter comprises an FBG tuned to a unique wavelength from any other tunable drop filter in said node.

6. The optical ring of claim 1 where each said tunable add filter includes a plurality of tunable lasers, each of which is tuned to a unique wavelength from any other tunable laser in said node.

7. The optical ring of claim 1 where each node of said plurality of nodes is sequentially coupled.

8. The optical ring of claim 1 where each said node further comprises:

said tunable drop filter comprising a first coupler having an input port, an output port and a reflected energy port, said first coupler input port coupled to optical energy in said optical node input and said first coupler reflected energy port coupled to said optical receive detector;

a tunable FBG coupled to said first coupler output port, said tunable FBG having an output;

a second coupler having an input port, an add port, and an output port, said input port coupled to said tunable FBG output, said output port coupling optical energy to said node output, and said add port coupled to optical energy generated by said tunable laser.

9. An optical ring having a plurality of nodes, each node having an output coupled to a subsequent station and an input coupled to a previous station, said optical ring supporting simultaneous communications in a plurality of separate wavelengths forming separate communication channels;

each said node having:

a plurality of tunable drop filters dropping selected wavelengths from an optical node input to a respective optical detector;

a plurality of tunable add filters for adding selected wavelengths to said optical node output, each said wavelength operative in a different optical communication channels from other said wavelengths;

a sensor and control interface for converting sensor data received on a particular optical channel into sensor reading outputs and also converting control input data into laser modulations on a particular channel, said sensor data and said control inputs having a length;

a scheduling and wavelength assignment controller for placing said control inputs onto particular wavelengths and for retrieving said sensor reading outputs;

and where each said node is a Colorless Directionless Contentionless (CDC) node utilizing said plurality of wavelengths operative to minimize a finish time.

10. The optical ring of claim 9 where said tunable drop filter includes a tunable FBG to reflect optical energy from a particular FBG into an optical coupler which is coupled to one of said optical detectors.

11. The optical ring of claim 9 where said plurality of tunable add filters includes tunable lasers generating optical energy coupled to said optical node output through an optical coupler.

12. The optical ring of claim 9 where wavelengths of said tunable add filters and wavelengths of said tunable drop filters are selected using a Mixed Integer Linear Program which schedules delivery of packets after determining:

K—the number of packets to be sent;
N—the number of nodes
W—the number of wavelengths
Pi—the number of transceivers at each node;
and thereafter finding a shortest finish time based on iteratively applying possible wavelength selections based on:
a first constraint of assigning wavelengths to transceivers;
a second constraint of time-disjointedness and wavelength disjointedness for each link;
a third constraint of time disjointedness and wavelength disjointedness for each source/destination connection.

13. The optical ring of claim 9 where wavelengths of said tunable add filters and wavelengths of said tunable drop filters are selected using an Earliest Finish-time, Least Variance (EFLV) assignment of wavelengths and stations to packets including, for each packet, the assignment of tunable add filter wavelengths and tunable drop filter wavelengths, a transmitter/receiver at a source/destination, and a continuous time interval, and iterating until a shortest finish time is determined.

14. The optical ring of claim 9 where said tunable add filter wavelengths and tunable drop filter wavelengths are selected using an Earliest Finish-time, Least Variance (EFLV) assignment of wavelengths and stations to packets, where the assignment includes the identification of less loaded transmitter/receiver pairs for later assignment.

15. The optical ring of claim 9 where said plurality of separate wavelengths forming separate communication channels are at least one of wavelength division multiplexed (WDM) channels or dense wavelength division multiplexed (DWDM) channels.

* * * * *

UNITED STATES PATENT AND TRADEMARK OFFICE
CERTIFICATE OF CORRECTION

| | | |
|---|---|---|
| PATENT NO. | : 8,571,409 B1 | Page 1 of 1 |
| APPLICATION NO. | : 13/295032 | |
| DATED | : October 29, 2013 | |
| INVENTOR(S) | : Rui Wang, Behzad Moslehi and Richard J. Black | |

It is certified that error appears in the above-identified patent and that said Letters Patent is hereby corrected as shown below:

In the specification

On Column 1, line 10, add the following sentences:
--This invention was made with Government support under contract N68335-10-C-0002 awarded by the Department of the Navy. The Government has certain rights in this invention.--

Signed and Sealed this
Eleventh Day of October, 2016

Michelle K. Lee
*Director of the United States Patent and Trademark Office*